US008606906B2

(12) United States Patent
Watanabe

(10) Patent No.: US 8,606,906 B2
(45) Date of Patent: Dec. 10, 2013

(54) WIRELESS COMMUNICATION DEVICE, INFORMATION DISTRIBUTION SYSTEM, PROGRAM

(75) Inventor: Kazuhiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 135 days.

(21) Appl. No.: 13/038,661

(22) Filed: Mar. 2, 2011

(65) Prior Publication Data
US 2011/0239305 A1 Sep. 29, 2011

(30) Foreign Application Priority Data

Mar. 29, 2010 (JP) ................................. 2010-075333

(51) Int. Cl.
G06F 15/173 (2006.01)
(52) U.S. Cl.
USPC ......... 709/224; 455/456.1; 370/351; 370/400
(58) Field of Classification Search
USPC ........ 709/224; 455/456.2; 370/338, 392, 315; 342/451
See application file for complete search history.

(56) References Cited

U.S. PATENT DOCUMENTS 6,332,127 B1*  12/2001  Bandera et al. ............ 705/14.55
6,353,398 B1*  3/2002   Amin et al. ............... 340/995.12
7,573,858 B2*  8/2009   Roh et al. ...................... 370/338
7,889,691 B2*  2/2011   Chen et al. ..................... 370/315
8,340,097 B2*  12/2012  Kim et al. ...................... 370/392
2005/0058109 A1*  3/2005   Ekberg ......................... 370/338
2008/0309556 A1*  12/2008  Hohl ............................. 342/451
2009/0046628 A1*  2/2009   Hall .............................. 370/328
2010/0131644 A1*  5/2010   Jeong et al. ................... 709/224
2010/0302947 A1*  12/2010  Leppanen et al. ............ 370/241
2010/0304759 A1*  12/2010  Leppanen et al. ......... 455/456.2
2011/0238751 A1*  9/2011   Belimpasakis et al. ....... 709/204

FOREIGN PATENT DOCUMENTS

JP    2008-219872    9/2008

* cited by examiner

Primary Examiner — Dustin Nguyen
(74) Attorney, Agent, or Firm — Oblon, Spivak, McClelland, Maier & Neustadt, L.L.P.

(57) ABSTRACT

There is provided a wireless communication device including a communication section which receives, from an information distribution device that distributes distribution information or another wireless communication device that has received the distribution information, the distribution information using ad hoc wireless communication, a position information acquisition section which acquires position information indicating a current position, a movement amount calculation section which calculates a movement amount from the information distribution device based on a change in the position information acquired by the position information acquisition section, and a distribution information management section which manages availability of the distribution information based on the movement amount and a predetermined limited area-radius that defines a limited area in which the distribution information is distributed.

8 Claims, 25 Drawing Sheets

FIG. 11

| 502 | 504 | 506 | 508 | 510 | 512 |
|---|---|---|---|---|---|
| TRANSMISSION-SOURCE X-Y VALUES | RECEPTION X-Y VALUES | MOVEMENT AMOUNT | HOP COUNT | LIMITED AREA-RADIUS | LIMITED HOP COUNT |
| (Xs,Ys) | (Xr,Yr) | (Xm,Ym) | HC | R | LHC |

| NODE | TIME | TRANSMISSION-SOURCE X-Y VALUES | RECEPTION X-Y VALUES | MOVEMENT AMOUNT | HOP COUNT | LIMITED AREA-RADIUS | LIMITED HOP COUNT |
|---|---|---|---|---|---|---|---|
| INFORMATION DISTRIBUTION DEVICE 200-1 | t0 | (Xs,Ys) | — | (0,0) | 0 | R | LHC |
| NODE 100A-1 | t0 | (Xs,Ys) | (Xr[A],Yr[A]) | (0,0) | 1 | R | LHC |
| NODE 100B-1 | t0 | (Xs,Ys) | (Xr[B],Yr[B]) | (0,0) | 1 | R | LHC |
| NODE 100B-1 | t1 | (Xs,Ys) | (Xr[B],Yr[B]) | (Xm[t1],Ym[t1]) | 1 | R | LHC |
| NODE 100C-1 | t1 | (Xs,Ys) | (Xr[C],Yr[C]) | (Xm[t1],Ym[t1]) | 2 | R | LHC |

FIG. 17

| NODE | TIME | TRANSMISSION-SOURCE X-Y VALUES | RECEPTION X-Y VALUES | MOVEMENT AMOUNT | HOP COUNT | LIMITED AREA-RADIUS | LIMITED HOP COUNT |
|---|---|---|---|---|---|---|---|
| INFORMATION DISTRIBUTION DEVICE 200-2 | t0 | (0,0) | — | (0,0) | 0 | R | LHC |
| NODE 100A-2 | t0 | (0,0) | (0,0) | (0,0) | 1 | R | LHC |
| NODE 100B-2 | t0 | (0,0) | (0,0) | (0,0) | 1 | R | LHC |
| NODE 100B-2 | t1 | (0,0) | (0,0) | (Xm[t1],Ym[t1]) | 1 | R | LHC |
| NODE 100C-2 | t1 | (0,0) | (0,0) | (Xm[t1],Ym[t1]) | 2 | R | LHC |

FIG. 18
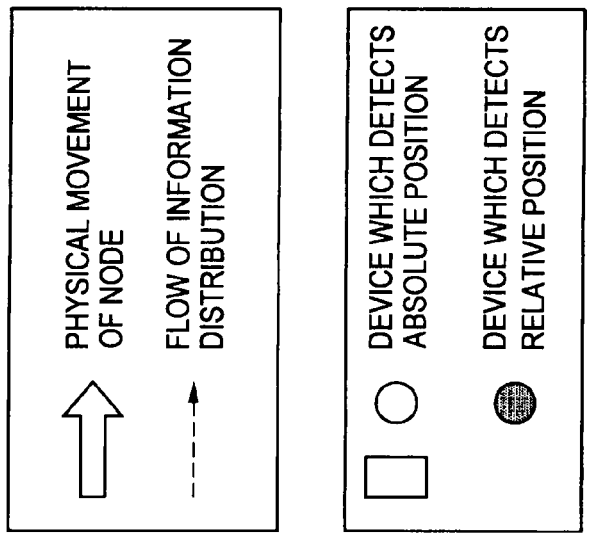
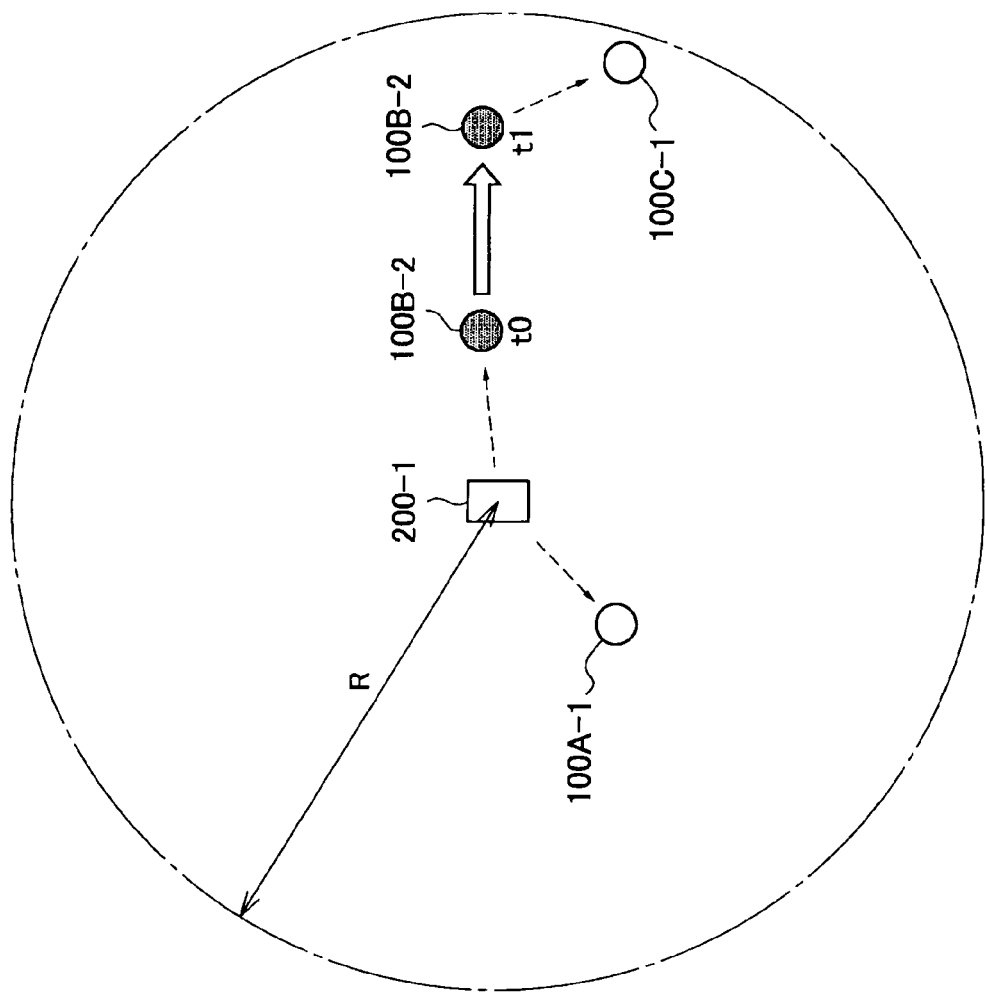

FIG. 19

| NODE | TIME | TRANSMISSION-SOURCE X-Y VALUES | RECEPTION X-Y VALUES | MOVEMENT AMOUNT | HOP COUNT | LIMITED AREA-RADIUS | LIMITED HOP COUNT |
|---|---|---|---|---|---|---|---|
| INFORMATION DISTRIBUTION DEVICE 200-1 | t0 | (Xs,Ys) | — | (0,0) | 0 | R | LHC |
| NODE 100A-1 | t0 | (Xs,Ys) | (Xr[A],Yr[A]) | (0,0) | 1 | R | LHC |
| NODE 100B-2 | t0 | (Xs,Ys) | (0,0) | (0,0) | 1 | R | LHC |
| NODE 100B-2 | t1 | (Xs,Ys) | (0,0) | (Xm[t1],Ym[t1]) | 1 | R | LHC |
| NODE 100C-1 | t1 | (Xs,Ys) | (Xr[C],Yr[C]) | (Xm[t1],Ym[t1]) | 2 | R | LHC |

FIG. 21

| NODE | TIME | TRANSMISSION-SOURCE X-Y VALUES | RECEPTION X-Y VALUES | MOVEMENT AMOUNT | HOP COUNT | LIMITED AREA-RADIUS | LIMITED HOP COUNT |
|---|---|---|---|---|---|---|---|
| 1102 | 1104 | 1106 | 1108 | 1110 | 1112 | 1114 | 1116 |
| INFORMATION DISTRIBUTION DEVICE 200-2 | t0 | (0,0) | - | (0,0) | 0 | R | LHC |
| NODE 100A-2 | t0 | (0,0) | (0,0) | (0,0) | 1 | R | LHC |
| NODE 100B-1 | t0 | (0,0) | (Xr[B],Yr[B]) | (0,0) | 1 | R | LHC |
| NODE 100B-1 | t1 | (0,0) | (Xr[B],Yr[B]) | (Xm[t1],Ym[t1]) | 1 | R | LHC |
| NODE 100C-2 | t1 | (0,0) | (0,0) | (Xm[t1],Ym[t1]) | 2 | R | LHC |

1800

1802 1804 1806 1808 1810

WIRELESS COMMUNICATION DEVICE, INFORMATION DISTRIBUTION SYSTEM, PROGRAM

BACKGROUND OF THE INVENTION

1. Field of the Invention

The present invention relates to a wireless communication device, an information distribution system, and a program.

2. Description of the Related Art

A data exchange using ad hoc communication, in which nodes directly communicate with each other, is currently drawing attention. In particular, the data exchange using ad hoc communication between mobile game terminals is widespread (for example, JP-A-2008-219872). As an example of utilization of the data exchange using ad hoc communication, there is given an information distribution system in the places limited to the real world. The information distribution system causes information to be distributed by ad hoc communication from an information distribution device installed at a specific place. A user can obtain the information only by visiting the place at which an information distribution terminal is installed. For this reason, the value of the distributed information can be enhanced.

For example, in an information distribution system shown in FIG. 23, an information distribution device 800 can distribute distribution information 9000 to a node 900A, a node 900B, and a node 900D, which are located in a distribution area 80. However, it is difficult for the information distribution device 800 to distribute the distribution information 9000 to a node 900C and a 900E, which are located outside the distribution area 80.

In general, the range in which the communication can be performed using the ad hoc communication is about several meters to several tens of meters in radius, as is called a PAN (Personal Area Network) or a LAN (Local Area Network). Accordingly, in order to expand the area of information distribution limited to the places of the real world, all that could be done was to increase the number of the information distribution devices 800 (FIG. 24).

On the other hand, as another example of utilization of the data exchange using ad hoc communication, there is given a method of automatically performing data exchange (hereinafter, referred to as "pass-by communication") in a short period of time at the time of a user and an unspecified user passing each other in the real world. In the pass-by communication, by setting a communication terminal in an operation mode for pass-by communication by the user, the user can exchange data with an unspecified number of users without explicitly performing any operation. According to the pass-by communication, a position of information moves as the user moves with a node. Then, the node transmits the information from the position after the movement to another node. For this reason, it is possible to substantially expand the area in which the information can be distributed.

SUMMARY OF THE INVENTION

However, when the information distribution area is expanded by simply using the pass-by communication, the distribution information is spread endlessly. Accordingly, there was an issue that the value of the information was greatly impaired.

In light of the foregoing, it is desirable to provide a wireless communication device, an information distribution system, and a program, which are novel and improved, and which can perform information distribution limited to the places of the real world while expanding the information distribution area.

According to an embodiment of the present invention, there is provided a wireless communication device which includes a communication section which receives, from an information distribution device that distributes distribution information or another wireless communication device that has received the distribution information, the distribution information using ad hoc wireless communication, a position information acquisition section which acquires position information indicating a current position, a movement amount calculation section which calculates a movement amount from the information distribution device based on a change in the position information acquired by the position information acquisition section, and a distribution information management section which manages availability of the distribution information based on the movement amount and a predetermined limited area-radius that defines a limited area in which the distribution information is distributed.

According to the above configuration, as for the received distribution information, the availability of the distribution information is managed based on the limited area-radius and the movement amount from the information distribution device. That is, since it is determined that the received distribution information is unavailable when a position of the received distribution information becomes outside the range of the limited area, it is possible to render the distribution information available only within the predetermined limited area while expanding the distribution area.

Further, the distribution information management section may determine the availability of the distribution information at least at a time at which the communication section receives the distribution information.

Further, the movement amount calculation section may update, after the communication section has received the distribution information, the movement amount at predetermined time intervals. The distribution information management section may determine the availability of the distribution information based on the updated movement amount.

Further, the distribution information management section may determine the availability of the distribution information further based on a hop count from the information distribution device.

Further, the position information acquisition section may acquire position information indicating an absolute position. When the information distribution device does not have a function of detecting an absolute position, the movement amount calculation section may calculate the movement amount from the information distribution device by adding a difference between position information at a time point of receiving the distribution information and position information at a current time point to a movement amount at the time point of receiving the distribution information.

Further, the communication section may use pass-by communication for communication with another wireless communication device.

Further, according to another embodiment of the present invention, there is provided an information distribution system which includes an information distribution device which distributes distribution information, and a wireless communication device which receives, from the information distribution device or another wireless communication device that has received the distribution information, the distribution information using ad hoc wireless communication. The wireless communication device includes a communication section which receives the distribution information, a position information acquisition section which acquires position information indicating a current position, a movement amount calculation section which calculates a movement amount from the information distribution device based on a change in the position information acquired by the position information acquisition section, and a distribution information management section which manages availability of the distribution information based on the movement amount and a predetermined limited area-radius that defines a limited area in which the distribution information is distributed.

Further, according to another embodiment of the present invention, there is provided a program for causing a computer to function as a wireless communication device which includes a communication section which receives, from an information distribution device that distributes distribution information or another wireless communication device that has received the distribution information, the distribution information using ad hoc wireless communication, a position information acquisition section which acquires position information indicating a current position, a movement amount calculation section which calculates a movement amount from the information distribution device based on a change in the position information acquired by the position information acquisition section, and a distribution information management section which manages availability of the distribution information based on the movement amount and a predetermined limited area-radius that defines a limited area in which the distribution information is distributed.

According to the embodiments of the present invention described above, there can be provided a wireless communication device, an information distribution system, and a program, which are novel and improved, and which can perform information distribution limited to the places of the real world while expanding the information distribution area.

BRIEF DESCRIPTION OF THE DRAWINGS

FIG. 11 is an explanatory diagram showing an example of a distribution information management table;

FIG. 15 is an explanatory diagram showing values of information managed by the first distribution example;

FIG. 17 is an explanatory diagram showing values of information managed by the second distribution example;

FIG. 18 is an explanatory diagram showing an outline of a third distribution example;

FIG. 19 is an explanatory diagram showing values of information managed by the third distribution example;

FIG. 21 is an explanatory diagram showing values of information managed by the fourth distribution example;

DETAILED DESCRIPTION OF THE EMBODIMENTS

Figure 1:
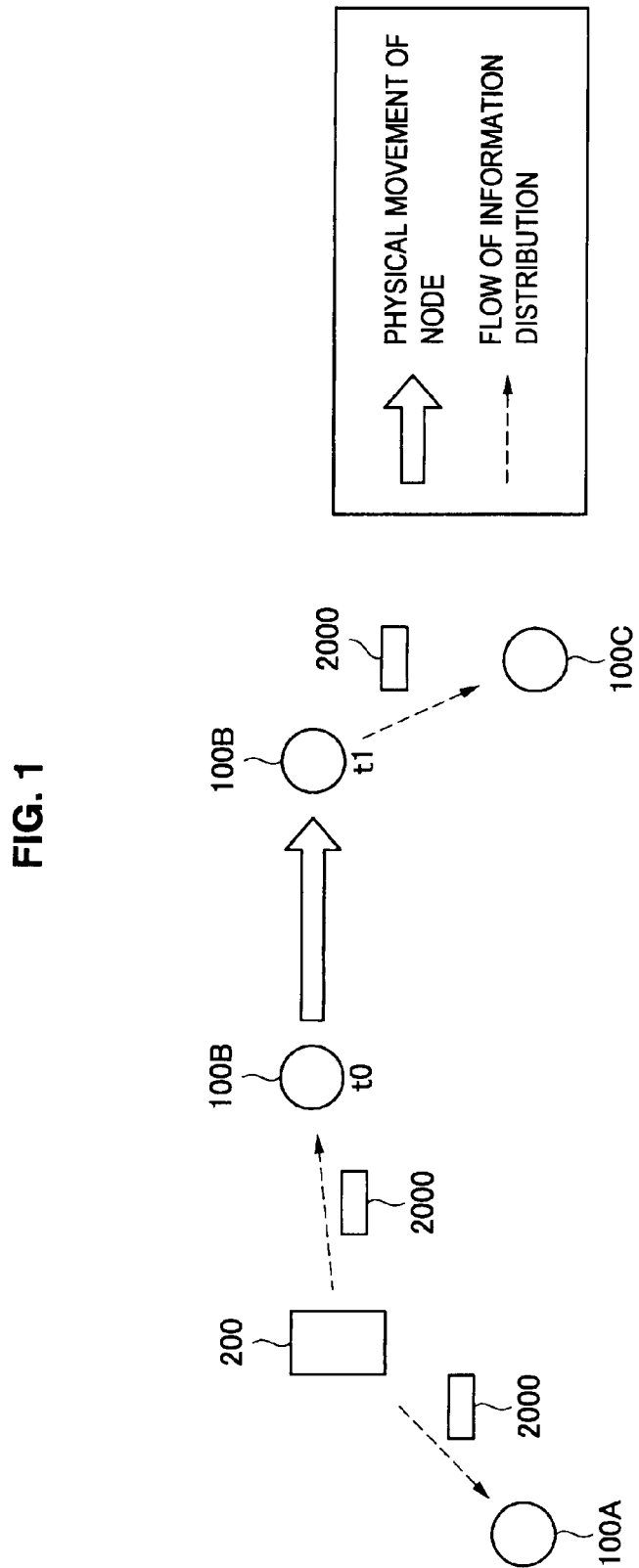
FIG. 1 is a schematic view of an information distribution system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Outline of information distribution system
2. Configuration of node
3. Configuration of information distribution device
4. Operation
5. Distribution example
5-1. First distribution example
5-2. Second distribution example
5-3. Third distribution example
5-4. Fourth distribution example
6. Applicable condition
7. Examples of effects 1. Outline of Information Distribution System First, with reference to FIG. 1, a configuration of an information distribution system 1 according to an embodiment of the present invention will be described. The information distribution system 1 includes an information distribution device 200 which distributes distribution information 2000 and nodes 100 which function as information reception devices that receive the distribution information 2000. The nodes 100 also function as information transmission devices that transmit the distribution information 2000.

The information distribution device 200 and the node 100 can transmit/receive the distribution information 2000 between one another using ad hoc communication. Further, the node 100 can transmit/receive the distribution information 2000 to/from another node 100 by so-called pass-by communication using ad hoc communication.

The information distribution system 1 according to the present embodiment realizes the expansion of the area in which information is distributed by using the pass-by communication in addition to information distribution using ad hoc communication of the past. In order to realize the information distribution limited to the places of the real world, the node 100 which has received the distribution information 2000 manages the received distribution information based on information of the places of the real world.

A distribution example used here for the description is as follows. A node 100A and a node 100B receive, at time t0, the distribution information 2000 distributed from the information distribution device 200 which is a transmission-source of the distribution information 2000. Then, after receiving the distribution information 2000, the node 100B physically moves, and at time t1, a node 100C receives the distribution information from the node 100B using the pass-by communication.

As described above, the distribution information 2000 distributed from the information distribution device 200 is distributed to the node 100A, the node 100B, and the node 100C.

Further, in this specification and the appended drawings, there are some cases where multiple structural elements that have substantially the same function and structure are distinguished from one another by being denoted with different alphabets after the same reference numerals. For example, the multiple structural elements that have substantially the same function and structure are distinguished from one another as necessary, for example, a node 100A and a node 100B. Note that, in the case where it is not necessary to distinguish the multiple structural elements that have substantially the same function and structure from one another, the multiple structural elements are denoted with the same reference numeral only. For example, in the case where it is not necessary to particularly distinguish the node 100A, the node 100B, and the like, they are each simply referred to as node 100.

Note that, the devices denoted with the same alphabet represent an identical casing. For example, two nodes 100B shown in FIG. 1 represent a position of the node 100B at time t0 and a position of the node 100B at time t1, respectively, and represent the same device.

Figure 2:
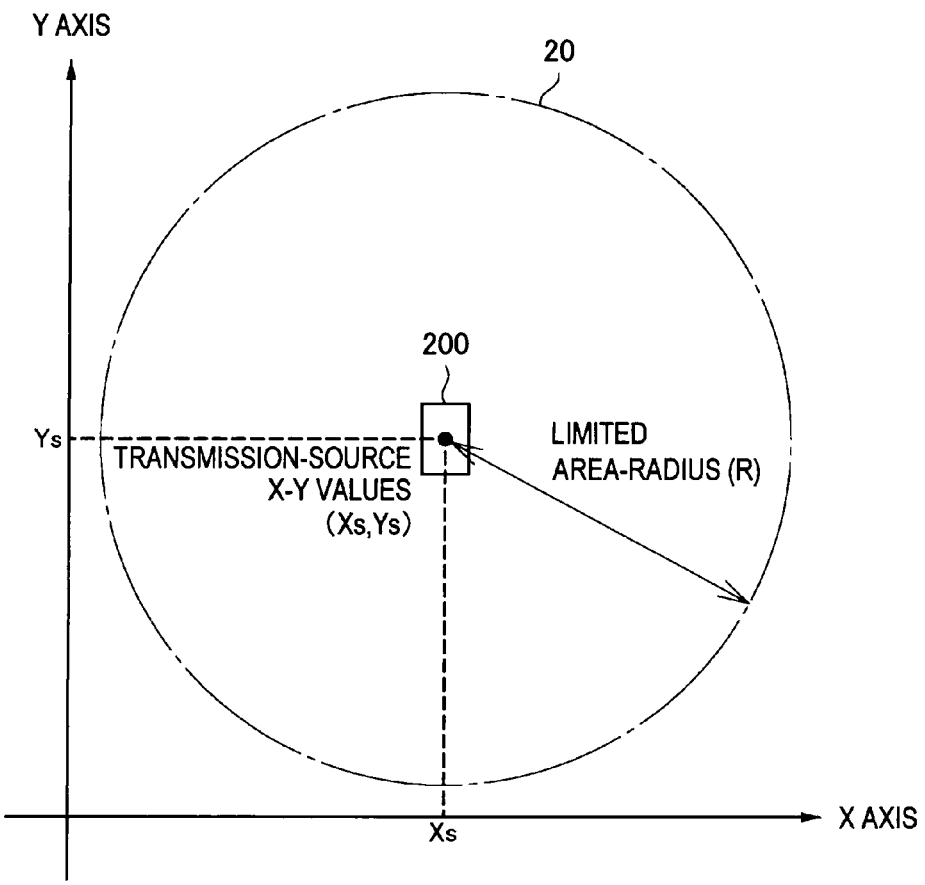
FIG. 2 is an explanatory diagram illustrating definitions of terms used in the embodiment.
Figure 3:
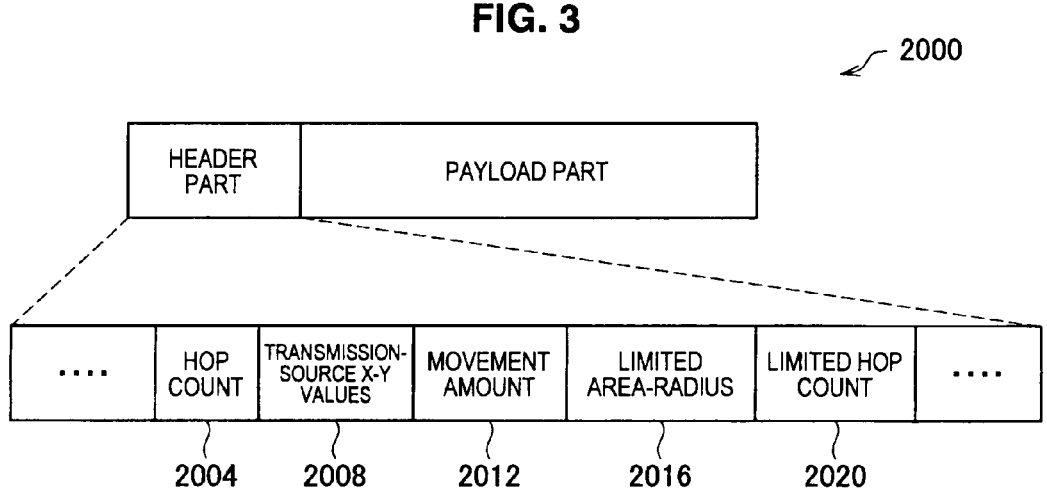
FIG. 3 is an explanatory diagram illustrating an example of a packet format of distribution information.

Next, with reference to FIGS. 2 and 3, definitions of terms used in the following description will be described. FIG. 2 is an explanatory diagram illustrating definitions of terms used in the present embodiment. Further, FIG. 3 is an explanatory diagram illustrating an example of a packet format of distribution information.

First, a range of information distribution will be described using FIG. 2. A range 20 of information distribution is defined by a circle with a limited area-radius R, whose center is the information distribution device 200 which is a transmission source. Note that position information of the transmission source is represented by transmission-source X-Y values (Xs, Ys). Then, a position of the node 100 is defined by being mapped on a two-dimensional X-Y axis. Note that, as for the X-Y values that represent the position in the present embodiment, there are assumed values obtained by absolute position detection technology such as a GPS (Global Positioning System), and in many cases, the X-Y values are latitude and longitude.

Further, whether or not the node 100 is in the range 20 of information distribution is determined by using a movement amount, which is a value representing how much the node 100 has moved from the transmission source. That is, when a value of the X axis of the movement amount is represented by Xm, and a value of the Y axis of the movement amount is represented by Ym, the following expression is satisfied when the node 100 is in the range 20 of information distribution.

$$Xm^2 + Ym^2 \leq R^2 \qquad \text{[Expression 1]}$$

It is determined regularly whether or not the distribution information 2000 is in the distribution range 20, and when a position of the distribution information 2000 becomes outside the distribution range 20, the distribution information 2000 is discarded. Accordingly, information distribution limited to the places of the real world can be realized. Note that it is not limited to the case where the distribution information 2000 is immediately discarded when it is located outside the distribution range 20, and the data itself of the distribution information 2000 may remain held and may be rendered unavailable.

Here, with reference to FIG. 3, in order to generate information for determining availability of the distribution information 2000, the description will be made on information which is added to a header of the distribution information 2000. In the header of the distribution information 2000, there are included a hop count 2004, transmission-source X-Y values 2008, a movement amount 2012, a limited area-radius 2016, and a limited hop count 2020. Of those, the transmission-source X-Y values 2008, the limited area-radius 2016, and the limited hop count 2020 are stored in the header at the information distribution device 200. Further, as for each of the hop count 2004 and the movement amount 2012, an initial value "0" is stored at the information distribution device 200, and after that, the values are appropriately updated at the node 100 which has received the distribution information 2000. The details of the updating of values of the hop count 2004 and the movement amount 2012 at the node 100 will be specifically described later.

In the above, the outline of the information distribution system 1 according to the present embodiment has been described. Next, the description will be made on configurations of the node 100 and the information distribution device 200 which are for realizing functions of the information distribution system.

2. Configuration of Node

Figure 4:
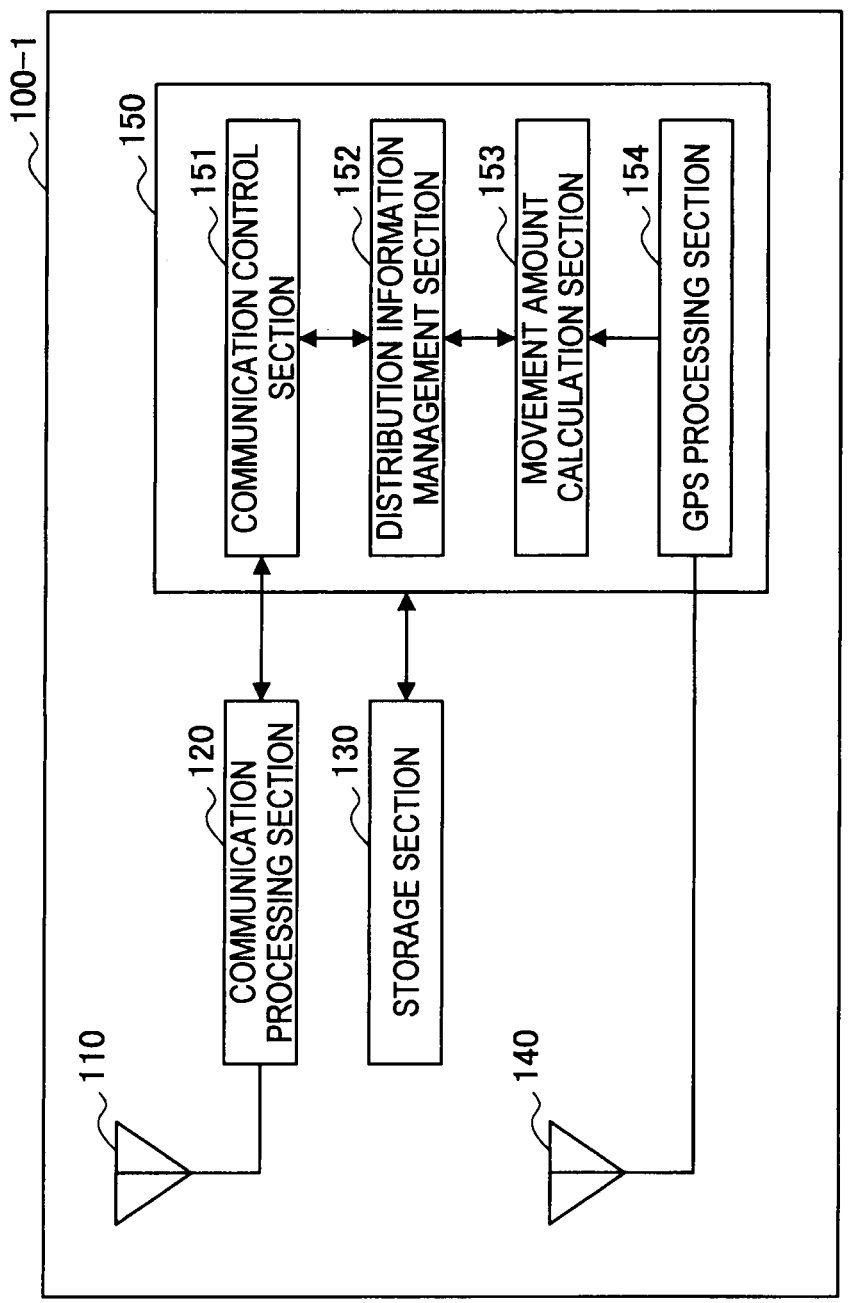
FIG. 4 is a block diagram showing an example of a configuration of a node which detects an absolute position.
Figure 5:
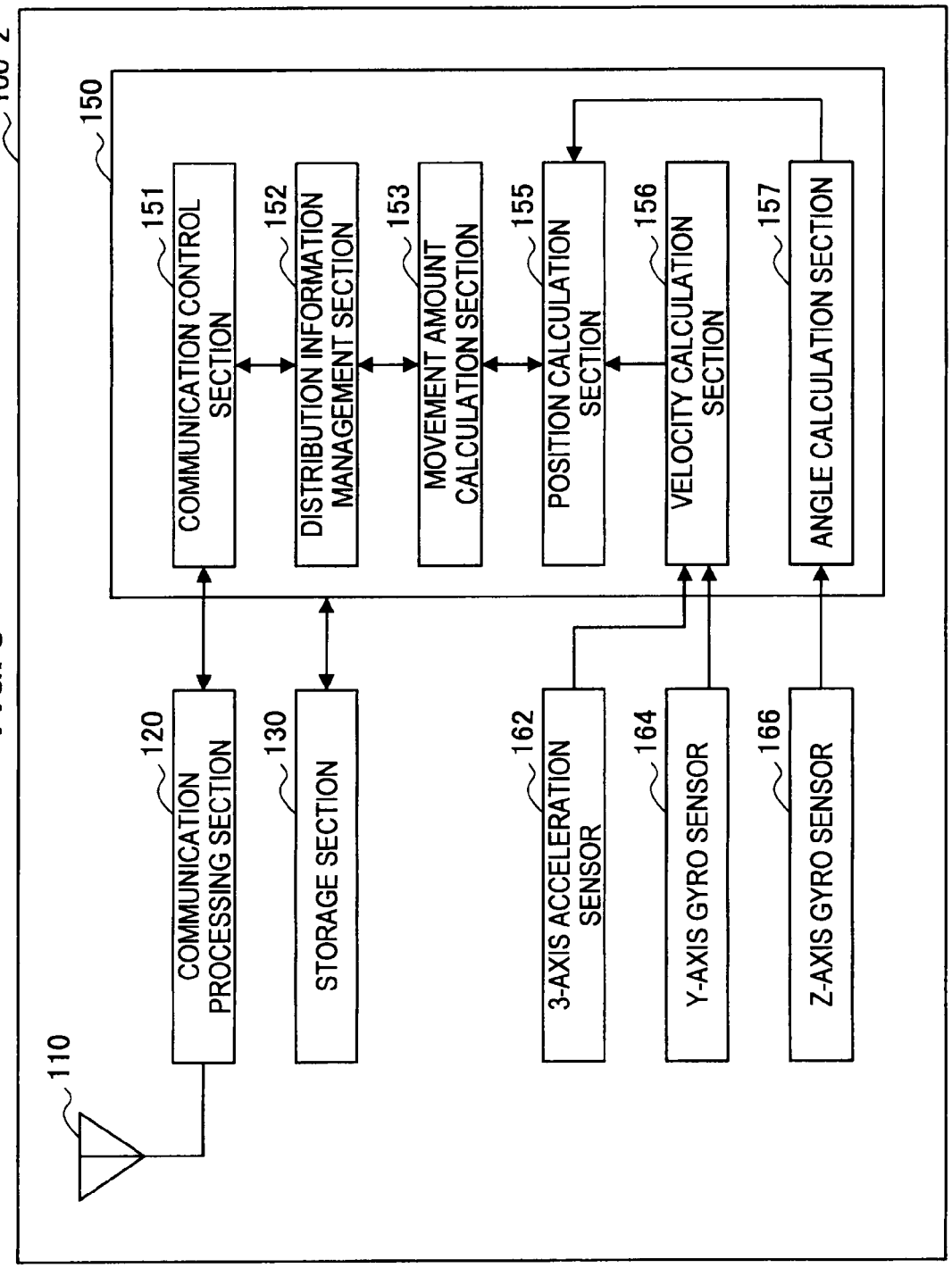
FIG. 5 is a block diagram showing an example of a configuration of a node which detects a relative position.

First, a configuration of the node 100 will be described by using FIGS. 4 and 5. FIG. 4 is a block diagram showing an example of a configuration of a node 100-1 which has a function of detecting an absolute position. Further, FIG. 5 is a block diagram showing an example of a configuration of a node 100-2 which has a function of detecting a relative position. The node 100-1 and the node 100-2 are identical to each other in terms of functions and roles except for modes of position detection. Accordingly, in the following description, when the nodes are distinguished from one another by being denoted with different numbers hyphenated after the same reference numerals, it means that the modes of position detection differ from each other.

Further, as described above, there are some cases where multiple structural elements that have substantially the same function and structure are distinguished from one another by being denoted with different alphabets after the same reference numerals. Accordingly, in the case where, although it is necessary to distinguish respective casings from one another, the mode of position detection is not particularly the issue of concern, the nodes are simply referred to as node 100A and node 100B. For example, in the case where it is written "node 100A-1", it means that the node 100A has a function of detecting an absolute position.

The information distribution system 1 according to the present embodiment may include both a node 100-1 having a function of detecting an absolute position and a node 100-2 having a function of detecting a relative position. Further, as will be described later, the information distribution device 200 may also have a function of detecting an absolute position or may also have a function of detecting a relative position.

(Configuration of Node 100-1 which Detects Absolute Position)

First, the node 100-1 shown in FIG. 4 mainly includes a communication antenna 110, a communication processing section 120, a storage section 130, a GPS antenna 140, and a control section 150. The control section 150 mainly has functions of a communication control section 151, a distribution information management section 152, a movement amount calculation section 153, and a GPS processing section 154.

The communication control section 151 controls operation of the communication antenna 110 and the communication processing section 120, and hence, the communication antenna 110 and the communication processing section 120 function as a communication section. The communication section performs ad hoc communication wirelessly with the information distribution device 200 and another node 100, thereby receiving the distribution information 2000. In particular, for the communication with the other node 100, pass-by communication is used, which automatically performs data exchange in a short period of time at the time of passing an unspecified number of users. Further, when the communication section passes another node 100 after receiving the distribution information 2000, the communication section also has a function of further transmitting the distribution information 2000 that the communication section has to the other node 100.

For example, when receiving a wireless signal, the communication processing section 120 performs downconversion of the wireless signals received by the communication antenna 110, decodes various data frames by converting the data frames into bit strings, processes various data frames when confirming that there is no error in the decoded data frames, and analyzes the data frames.

Further, at the time of transmitting the wireless signal, the communication processing section 120 generates various data packets in response to a request from a higher-level layer, performs processing of addition of error detection codes such as various data headers and FCSs (Frame Check Sequences), generates a modulation signal in a frequency band of a carrier wave from the processed data, and causes the communication antenna 110 to transmit the modulation signal as a wireless signal.

The communication control section 151 controls communication in accordance with a wireless communication standard such as Wireless LAN (hereinafter, referred to as WLAN), Bluetooth, and Zigbee. The communication control section 151 performs control that supports at least one of the wireless communication standards listed above. The control may support multiple wireless communication standards. When a node 100 that supports multiple wireless communication standards is present in the information distribution system 1, even a node 100 that supports different wireless communication standard can receive identical distribution information 2000 via the node 100 that supports multiple wireless communication standards.

The storage section 130 has a role as a work area for data processing performed by the control section 150, and a function as a storage medium for holding various types of data. The storage section 130 may be a storage medium such as a non-volatile memory, a magnetic disk, an optical disk, and an MO (Magneto Optical) disk. Examples of the non-volatile memory include a flash memory, an EEPROM (Electrically Erasable Programmable Read-Only Memory), and an EPROM (Erasable Programmable ROM). Further, examples of the magnetic disk include a hard disk and a disc-like magnetic disk. Further, examples of the optical disk include a CD (Compact Disc, a DVD-R (Digital Versatile Disc Recordable), and a BD (Blu-ray Disc (registered trademark)).

The GPS processing section 154 processes a GPS signal received by the GPS antenna 140, and hence, the GPS antenna 140 and the GPS processing section 154 function as a position information acquisition section which acquires absolute position information of the node 100-1 at the time point at which the GPS signal is generated.

The GPS antenna 140 is capable of receiving GPS signals from multiple GPS satellites, and inputs the received GPS signals to the GPS processing section 154. Note that the GPS signals received here include orbital data indicating orbits of the GPS satellites and information such as transmission time of the signals.

The GPS processing section 154 calculates position information indicating a current position of the node 100-1 based on the multiple GPS signals input from the GPS antenna 140, and supplies the movement amount calculation section 153 with the calculated position information. To be specific, the GPS processing section 154 calculates positions of the respective GPS satellites based on the orbital data obtained by demodulating the multiple GPS signals, and calculates distances from the respective GPS satellites to the node 100-1 based on each of the differences between transmission time and reception time of each GPS signal. Then, based on the calculated positions of the respective GPS satellites and the calculated distances from the respective GPS satellites to the node 100-1, a current three-dimensional position is calculated.

The movement amount calculation section 153 calculates a movement amount from the information distribution device 200, which is a distribution source of the distribution information 2000, based on a change in the position information acquired by the position information acquisition section. The movement amount calculation section 153 calculates the movement amount at a specified timing in accordance with the control of the distribution information management section 152.

In the case where the information distribution device 200, which is a distribution source of the received distribution information 2000, is a device having a function of detecting an absolute position, that is, in the case where the transmission-source X-Y values contained in the header of the distribution information 2000 is not (0, 0), the movement amount calculation section 153 calculates the movement amount based on the difference between the absolute position of the information distribution device 200 and the absolute position of the node 100-1 supplied by the GPS processing section 154. That is, when the transmission-source X-Y values are represented by (Xs, Ys) and the information of the current position the node 100-1 at time t is represented by (Xn[t], Yn[t]), a movement amount (Xm[t], Ym[t]) of the distribution information 2000 at time t is represented by the following expression.

$$Xm[t]=Xn[t]-Xs$$

$$Ym[t]=Yn[t]-Ys \qquad \text{[Expression 2]}$$

Further, in the case where the information distribution device 200, which is a distribution source of the received distribution information 2000, is a device that does not have a function of detecting an absolute position, the movement amount calculation section 153 calculates the movement amount from the information distribution device 200 by adding a value of the movement amount from the time point of receiving the distribution information 2000 to a value of the movement amount at the time point of receiving the distribution information 2000 whose values are stored by the information distribution device 200 or another node 100. Here, the movement amount from the time point of receiving the distribution information 2000 to the current time point can be calculated based on the position information supplied from the GPS processing section 154. That is, the movement amount of the distribution information 2000 at time t is represented by the following expression, when a time at which the distribution information 2000 is received is represented by $t_0$, and the time point of receiving the distribution information 2000 at time $t_0$ is represented by $(Xr[t_0], Yr[t_0])$.

$$Xm[t]=Xm[t_0]+(Xn[t]-Xr[t_0])$$

$$Ym[t]=Ym[t_0]+(Yn[t]-Yr[t_0])$$ [Expression 3]

The distribution information management section 152 manages availability of distribution information based on the movement amount calculated by the movement amount calculation section 153 and a predetermined limited area-radius R that defines a limited area in which the distribution information 2000 is distributed. The distribution information management section 152 determines, at least at the time point at which the communication section receives the distribution information 2000, availability of the distribution information before storing the distribution information 2000 in the storage section 130 as available data. Here, in the case where it is determined that the distribution information 2000 is unavailable, that is, in the case where a position of the node 100-1 which has received the distribution information 2000 is outside the distribution range 20, the distribution information management section 152 discards the distribution information 2000. Further, in the case where it is determined that the position of the node 100-1 is in the distribution range 20, the distribution information management section 152 creates a distribution information management table, and stores the distribution information management table in the storage section 130. The details of the distribution information management table will be described later.

Further, after receiving the distribution information 2000, the distribution information management section 152 may regularly determine the availability of the distribution information at predetermined time intervals. The distribution information management section 152 controls the movement amount calculation section 153 at predetermined time intervals, and causes the movement amount calculation section 153 to calculate the movement amount. Then, the distribution information management section 152 updates the value of the movement amount in the distribution information management table using the value of the calculated movement amount.

(Configuration of Node 100-2 which Detects Relative Position)

Next, a configuration of the node 100-2 which detects a relative position will be described. The node 100-2 mainly includes a communication antenna 110, a communication processing section 120, a storage section 130, a control section 150, a 3-axis acceleration sensor 162, a Y-axis gyro sensor 164, and a Z-axis gyro sensor 166. The control section 150 mainly has functions of a communication control section 151, a distribution information management section 152, a movement amount calculation section 153, a position calculation section 155, a velocity calculation section 156, and an angle calculation section 157.

That is, compared with the node 100-1, the node 100-2 differs from the node 100-1 in that, in place of the GPS antenna 140 and the GPS processing section 154 which function as the position information acquisition section, the node 100-2 includes the 3-axis acceleration sensor 162, the Y-axis gyro sensor 164, the Z-axis gyro sensor 166, the position calculation section 155, the velocity calculation section 156, and the angle calculation section 157, which function as the position information acquisition section. Further, being attributed to the difference, the method of calculating the movement amount by the movement amount calculation section 153 is different from the case of the node 100-1. Hereinafter, the differences will be described, and the description on the same functional configuration as that of the node 100-1 will be omitted.

The 3-axis acceleration sensor 162 is a sensor having a function of detecting, as voltage values, an acceleration rate $\alpha_x$ along the X axis, an acceleration rate $\alpha_y$ along the Y axis, and an acceleration rate $\alpha_z$ along the Z axis. The 3-axis acceleration sensor 162 detects the acceleration rate $\alpha_x$, the acceleration rate $\alpha_y$, and the acceleration rate a, at a sampling frequency of 50 Hz, for example, and inputs data indicating the detected acceleration rates to the velocity calculation section 156.

The Y-axis gyro sensor 164 is a sensor having a function of detecting, as a voltage value, a pitch rate $\omega_y$ which is an angular velocity around the Y axis. The Y-axis gyro sensor 164 detects the pitch rate at a sampling frequency of 50 Hz, for example, and inputs data indicating the detected pitch rate to the velocity calculation section 156.

The velocity calculation section 156 divides the acceleration rate $\alpha_z$ along the Z axis input from the 3-axis acceleration sensor 162 by the pitch rate $\omega_y$ input from the Y-axis gyro sensor 164, thereby calculating a velocity V in the travelling direction 50 times per second, for example, and inputs the calculated velocity V to the position calculation section 155.

The Z-axis gyro sensor 166 is a sensor having a function of detecting, as a voltage value, a yaw rate $\omega_z$ which is a variable velocity (angular velocity) of the rotation angle around the Z axis when the node 100-2 is rotated. The Z-axis gyro sensor 166 detects the yaw rate at a sampling frequency of 50 Hz, for example, and inputs data indicating the detected yaw rate to the angle calculation section 157.

The angle calculation section 157 calculates an angle θ of when the node 100-2 is rotated by multiplying the yaw rate w input from the Z-axis gyro sensor 166 by a sampling frequency (here, for example, 0.02 s), and inputs angle data indicating the angle θ to the position calculation section 155.

The position calculation section 155 has a function of calculating position information of a current position based on the velocity V calculated by the velocity calculation section 156 and the angle θ calculated by the angle calculation section 157. Specifically, the position calculation section 155 calculates an amount of change from the position at the previous calculation to the current position based on the velocity V and the angle θ. Then, the position calculation section 155 supplies the movement amount calculation section 153 with position information indicating the amount of change of the current position.

The movement amount calculation section 153 calculates position information indicating the amount of change of the current position supplied from the position calculation section 155 and a movement amount from the information distribution device 200, which is a distribution source of the distribution information 2000. To be specific, the movement amount calculation section 153 calculates the movement amount from the information distribution device 200 by adding a value of the movement amount from the time point of receiving the distribution information 2000 to a value of the movement amount at the time point of receiving the distribution information 2000.

That is, the following expression represents the movement amount (Xm[t], Ym[t]) from the information distribution device 200 at time t, when the change of the position of the node 100-2 at time t is represented by (x[t], y[t]).

$$Xm[t] = Xm[t_0] + \sum_{T=t_0}^{t}(x[T])$$  [Expression 4]

$$Ym[t] = Ym[t_0] + \sum_{T=t_0}^{t}(y[T])$$

In addition to the function described in the configuration of the node 100-1, the distribution information management section 152 of the node 100-2 determines availability of the distribution information 2000 further based on the hop count from the information distribution device 200 to the node 100-2. The processing is for dealing with an issue that occurs in the node 100-2 which detects a relative position. Next, with reference to FIG. 6, description will be made on the issue.

Figure 6:
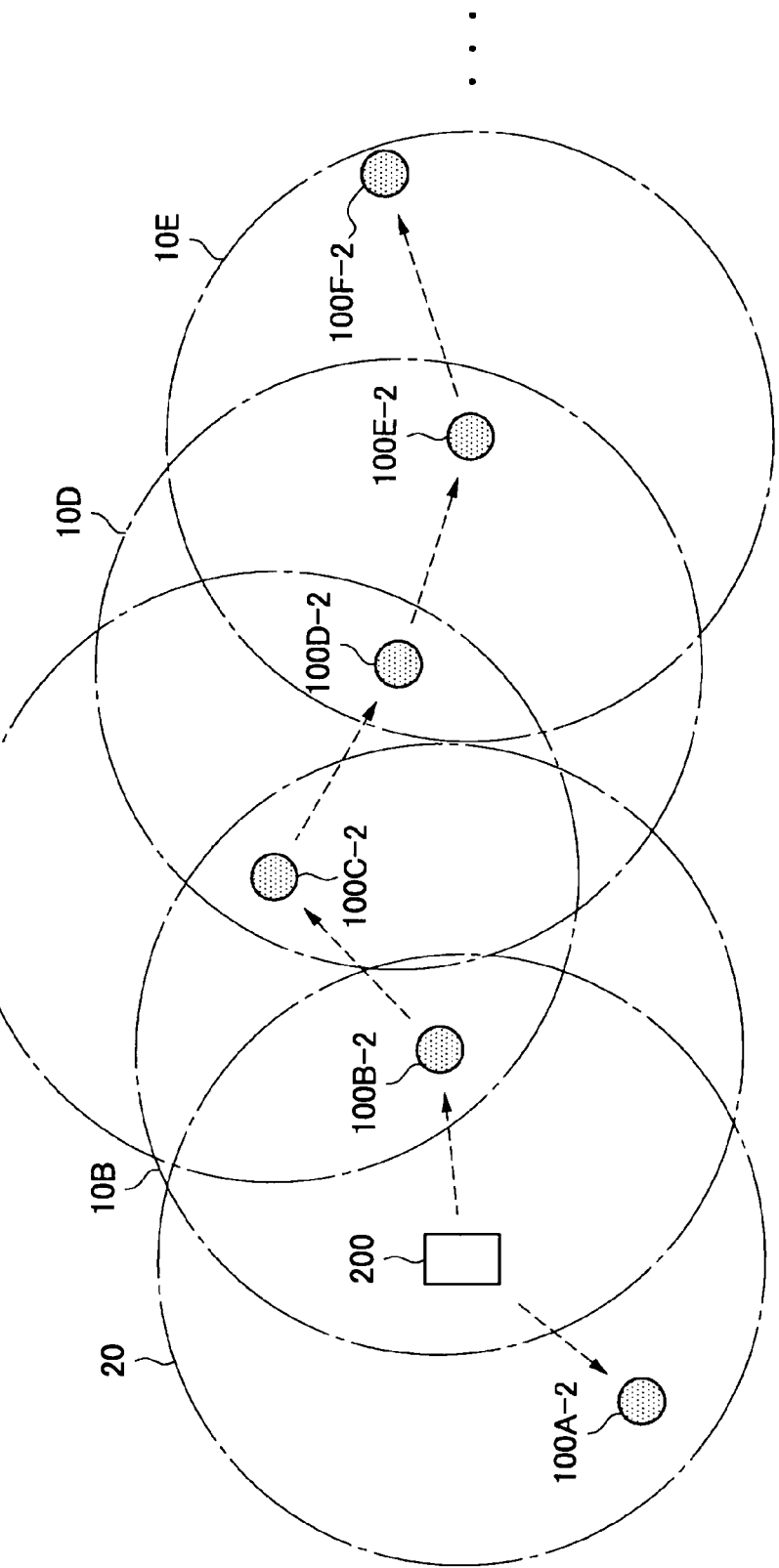
FIG. 6 is an explanatory diagram illustrating necessity for limitation using a hop count.

As shown in FIG. 6, in the case where a distance between a node 100B-2 and a node 100C-2, a distance between the node 100C-2 and a node 100D-2, a distance between the node 100D-2 and a node 100E-2, and a distance between the node 100E-2 and a node 100E-2 are each in a range of pass-by communication, there are cases where the distribution information 2000 is transmitted/received between the nodes endlessly. That is, it is difficult for the node 100-2 which detects a relative position to detect a change of position unless the node 100-2 itself physically moves. Accordingly, when the pass-by communication is performed in a state where all the node 100B-2, the node 100C-2, the node 100D-2, the node 100E-2, and the node 100E-2 are stood still, the distribution information 2000 is transmitted/received between the nodes endlessly.

In order to solve the issue, the node 100-2 which detects a relative position adopts a concept of limited hop count. That is, the number of hops is counted every time the pass-by communication is executed after the distribution information is distributed from the information distribution device 200, and an upper limit (limited hop count) is set to the number of hops, thereby avoiding transmission of the distribution information 2000 equal to or more than a predetermined number of times.

To be specific, when the pass-by communication is started but the distribution information 2000 is not transmitted yet, the distribution information management section 152 determines whether or not a value in which 1 is added to the hop count is equal to or less than a value of the limited hop count, and in the case where the value of the hop count plus 1 is equal to or less than the value of the limited hop count, the distribution information 2000 is transmitted. On the other hand, in the case where the value of the hop count plus 1 is not equal to or less than the value of the limited hop count, the distribution information management section 152 does not transmit the distribution information 2000.

3. Configuration of Information Distribution Device

Figure 7:
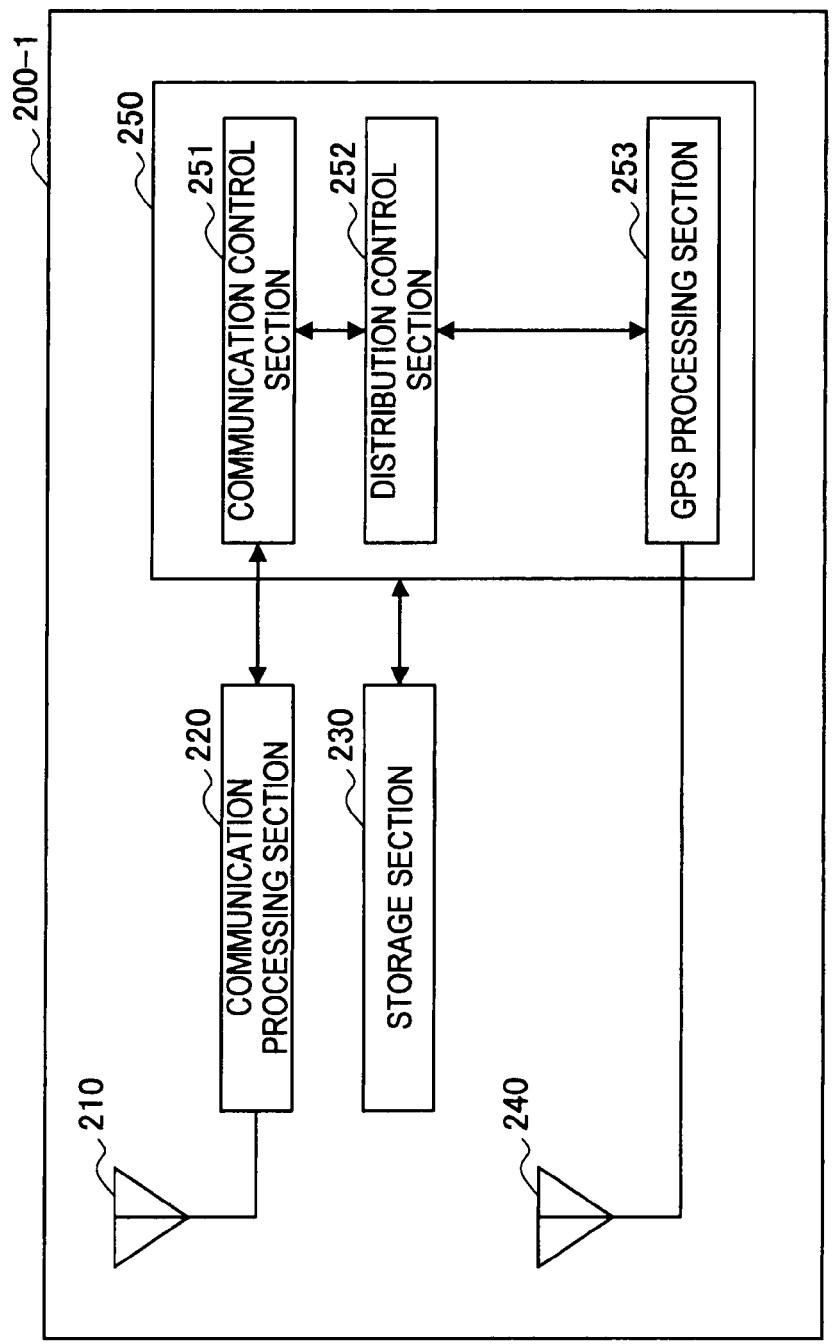
FIG. 7 is a block diagram showing an example of a configuration of an information distribution device which detects an absolute position.
Figure 8:
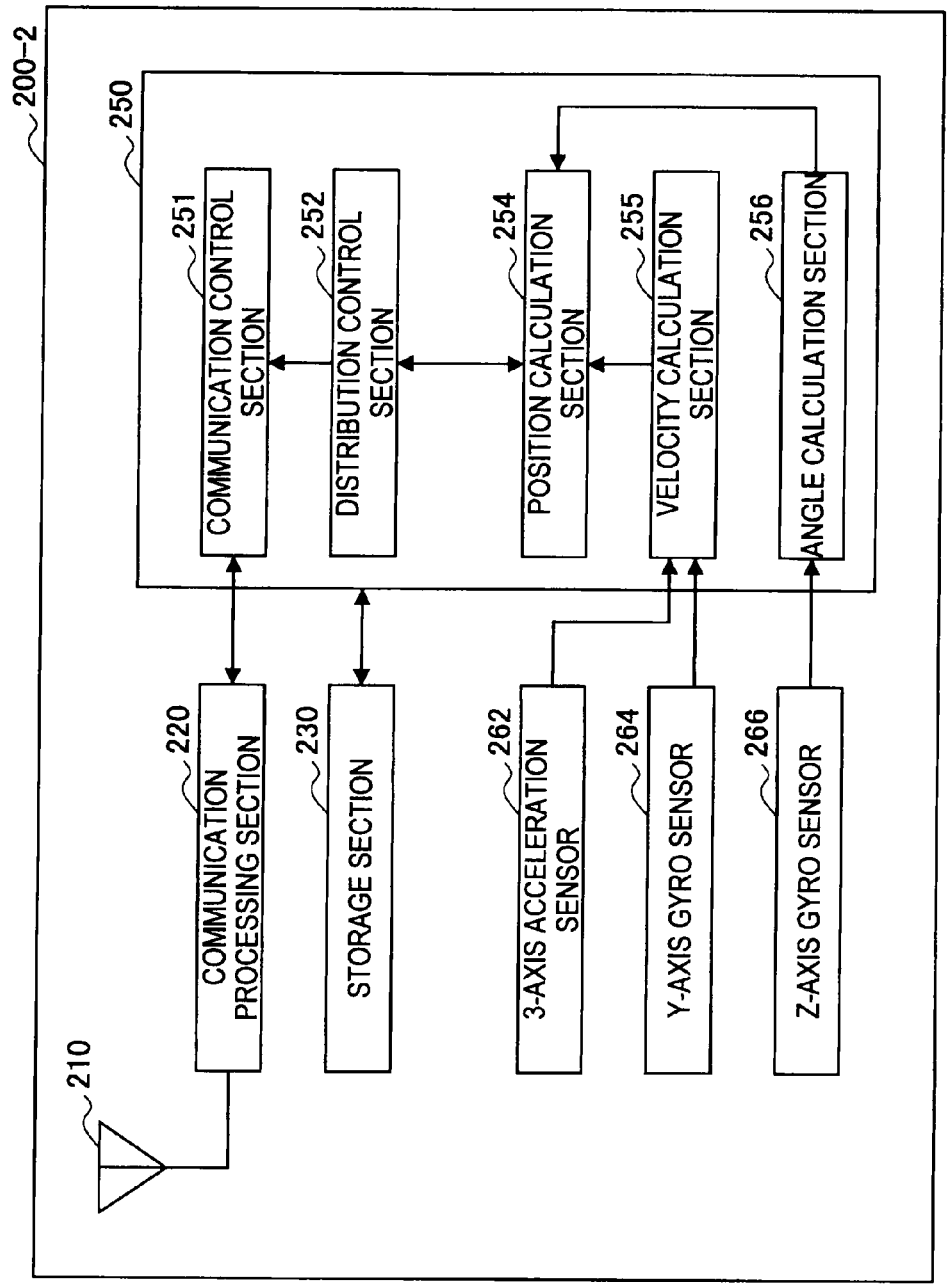
FIG. 8 is a block diagram showing an example of a configuration of an information distribution device which detects a relative position.

Next, a configuration of the information distribution device 200 will be described with reference to FIGS. 7 and 8. FIG. 7 is a block diagram showing a configuration of an information distribution device which has a function of detecting absolute position information. FIG. 8 is a block diagram showing a configuration of an information distribution device which has a function of detecting relative position information.

(Configuration of Information Distribution Device 200-1 which Detects Absolute Position)

First, an information distribution device 200-1 shown in FIG. 7 mainly includes a communication antenna 210, a communication processing section 220, a storage section 230, a GPS antenna 240, and a control section 250. The control section 250 mainly has functions of a communication control section 251, a distribution control section 252, and a GPS processing section 253.

The communication control section 251 controls operation of the communication antenna 210 and the communication processing section 220, and hence, the communication antenna 210 and the communication processing section 220 function as a communication section. The communication section performs ad hoc communication wirelessly with the node 100, thereby distributing the distribution information 2000.

For example, when receiving a wireless signal, the communication processing section 220 performs downconversion of the wireless signals received by the communication antenna 210, decodes various data frames by converting the data frames into bit strings, processes various data frames when confirming that there is no error in the decoded data frames, and analyzes the data frames.

Further, at the time of transmitting the wireless signal, the communication processing section 220 generates various data packets in response to a request from a higher-level layer, performs processing of addition of error detection codes such as various data headers and FCSs (Frame Check Sequences), generates a modulation signal in a frequency band of a carrier wave from the processed data, and causes the communication antenna 210 to transmit the modulation signal as a wireless signal.

The communication control section 251 controls communication in accordance with a wireless communication standard such as Wireless LAN (hereinafter, referred to as WLAN), Bluetooth, and Zigbee.

The storage section 230 has a role as a work area for data processing performed by the control section 250, and a function as a storage medium for holding various types of data. The storage section 230 may be a storage medium such as a non-volatile memory, a magnetic disk, an optical disk, and an MO (Magneto Optical) disk. Examples of the non-volatile memory include a flash memory, an EEPROM (Electrically Erasable Programmable Read-Only Memory), and an EPROM (Erasable Programmable ROM). Further, examples of the magnetic disk include a hard disk and a disc-like magnetic disk. Further, examples of the optical disk include a CD (Compact Disc, a DVD-R (Digital Versatile Disc Recordable), and a BD (Blu-ray Disc (registered trademark)).

The GPS processing section 253 processes a GPS signal received by the GPS antenna 240, and hence, the GPS antenna 240 and the GPS processing section 253 function as a position information acquisition section which acquires absolute position information of the information distribution device 200-1 at the time at which the GPS signal is generated.

The GPS antenna 240 is capable of receiving GPS signals from multiple GPS satellites, and inputs the received GPS signals to the GPS processing section 253. Note that the GPS signals received here include orbital data indicating orbits of the GPS satellites and information such as transmission time of the signals.

The GPS processing section 253 calculates position information indicating a current position of the information distribution device 200-1 based on the multiple GPS signals input from the GPS antenna 240, and supplies the distribution control section 252 with the calculated position information. To be specific, the GPS processing section 253 calculates positions of the respective GPS satellites based on the orbital data obtained by demodulating the multiple GPS signals, and calculates distances from the respective GPS satellites to the information distribution device 200-1 based on each of the differences between transmission time and reception time of each GPS signal. Then, based on the calculated positions of the respective GPS satellites and the calculated distances from the respective GPS satellites to the information distribution device 200-1, a current three-dimensional position is calculated.

The distribution control section 252 controls operation of the GPS processing section 253 and the GPS antenna 240, thereby receiving current position information of the information distribution device 200-1 from the GPS processing section 253. The distribution control section 252 generates header information of the distribution information 2000 by using the position information. That is, when the distribution control section 252 detects that a node 100 which requests acquisition of distribution information is present within a communication region of the information distribution device 200, the distribution control section 252 stores the position information supplied by the GPS processing section 253 in the region for storing transmission-source X-Y values in the header of the distribution information 2000, and causes the communication section to distribute the distribution information 2000 to the node 100.

(Configuration of Information Distribution Device 200-2 which Detects Relative Position)

Next, a configuration of an information distribution device 200-2 which detects a relative position will be described with reference to FIG. 8. The information distribution device 200-2 shown in FIG. 8 mainly includes a communication antenna 210, a communication processing section 220, a storage section 230, a control section 250, a 3-axis acceleration sensor 262, a Y-axis gyro sensor 264, and a Z-axis gyro sensor 266. The control section 250 mainly has functions of a communication control section 251, a distribution control section 252, a position calculation section 254, a velocity calculation section 255, and an angle calculation section 256.

That is, compared with the information distribution device 200-1, the information distribution device 200-2 differs from the information distribution device 200-1 in that, in place of the GPS antenna 240 and the GPS processing section 253 which function as the position information acquisition section, the information distribution device 200-2 includes the 3-axis acceleration sensor 262, the Y-axis gyro sensor 264, the Z-axis gyro sensor 266, the position calculation section 254, the velocity calculation section 255, and the angle calculation section 256, which function as the position information acquisition section. Hereinafter, the difference will be described, and the description on the same functional configuration as that of the information distribution device 200-1 will be omitted.

The 3-axis acceleration sensor 262 is a sensor having a function of detecting, as voltage values, an acceleration rate $\alpha_x$ along the X axis, an acceleration rate $\alpha_y$ along the Y axis, and an acceleration rate $\alpha_z$ along the Z axis. The 3-axis acceleration sensor 262 detects the acceleration rate $\alpha_x$, the acceleration rate $\alpha_y$, and the acceleration rate $\alpha_z$ at a sampling frequency of 50 Hz, for example, and inputs data indicating the detected acceleration rates to the velocity calculation section 255.

The Y-axis gyro sensor 264 is a sensor having a function of detecting, as a voltage value, a pitch rate $\omega_y$ which is an angular velocity around the Y axis. The Y-axis gyro sensor 264 detects the pitch rate at a sampling frequency of 50 Hz, for example, and inputs data indicating the detected pitch rate to the velocity calculation section 255.

The velocity calculation section 255 divides the acceleration rate $\alpha_z$ along the Z axis input from the 3-axis acceleration sensor 262 by the pitch rate $\omega_y$ input from the Y-axis gyro sensor 264, thereby calculating a velocity V in the travelling direction 50 times per second, for example, and inputs the calculated velocity V to the position calculation section 254.

The Z-axis gyro sensor 266 is a sensor having a function of detecting, as a voltage value, a yaw rate $\omega_z$ which is a variable velocity (angular velocity) of the rotation angle around the Z axis when the information distribution device 200 is rotated. The Z-axis gyro sensor 266 detects the yaw rate at a sampling frequency of 50 Hz, for example, and inputs data indicating the detected yaw rate to the angle calculation section 256.

The angle calculation section 256 calculates an angle θ of when the information distribution device 200-2 is rotated by multiplying the yaw rate $\omega_z$ input from the Z-axis gyro sensor 266 by a sampling frequency (here, for example, 0.02 s), and inputs angle data indicating the angle θ to the position calculation section 254.

The position calculation section 254 has a function of calculating position information of a current position based on the velocity V calculated by the velocity calculation section 255 and the angle θ calculated by the angle calculation section 256. Specifically, the position calculation section 254 calculates an amount of change from the position at the previous calculation to the current position based on the velocity V and the angle θ. Then, the position calculation section 254 supplies the distribution control section 252 with position information indicating the amount of change of the current position.

In the case where the position information acquisition section detects relative position information, the distribution control section 252 stores values of (0, 0) as transmission-source X-Y values 255 in the header of the distribution information 2000, and causes the communication section to distribute the distribution information 2000.

Next, with reference to FIGS. 9 to 13, description will be made on operation performed in the node 100 in the information distribution system 1 which is realized by the configuration described above.

4. Operation

Figure 9:
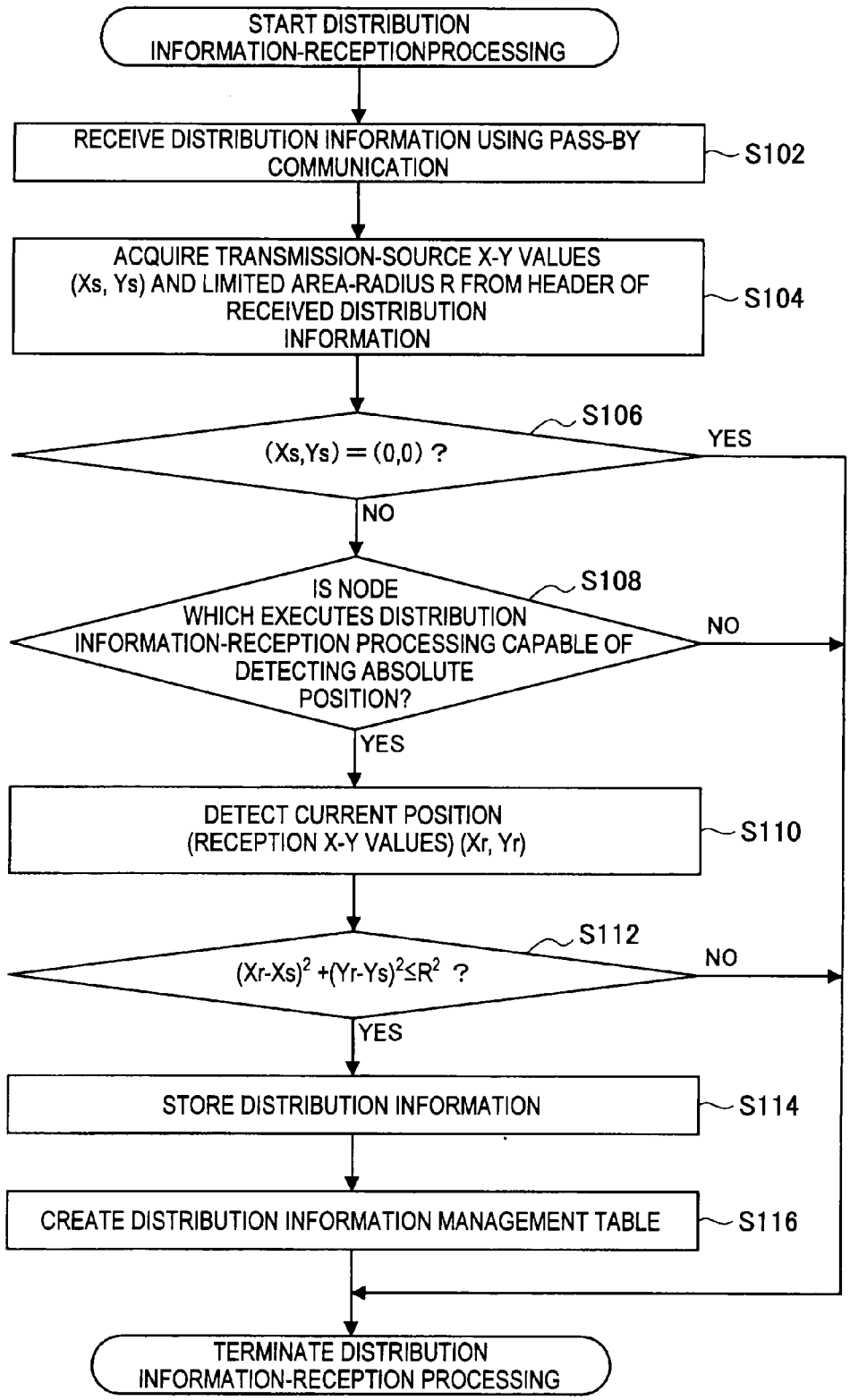
FIG. 9 is a flowchart showing processing of receiving distribution information.
Figure 10:
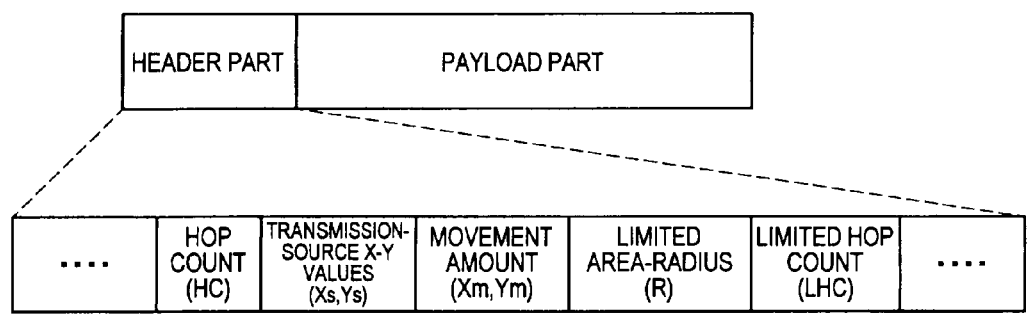
FIG. 10 is an explanatory diagram showing respective values of a header of the distribution information.
Figure 12:
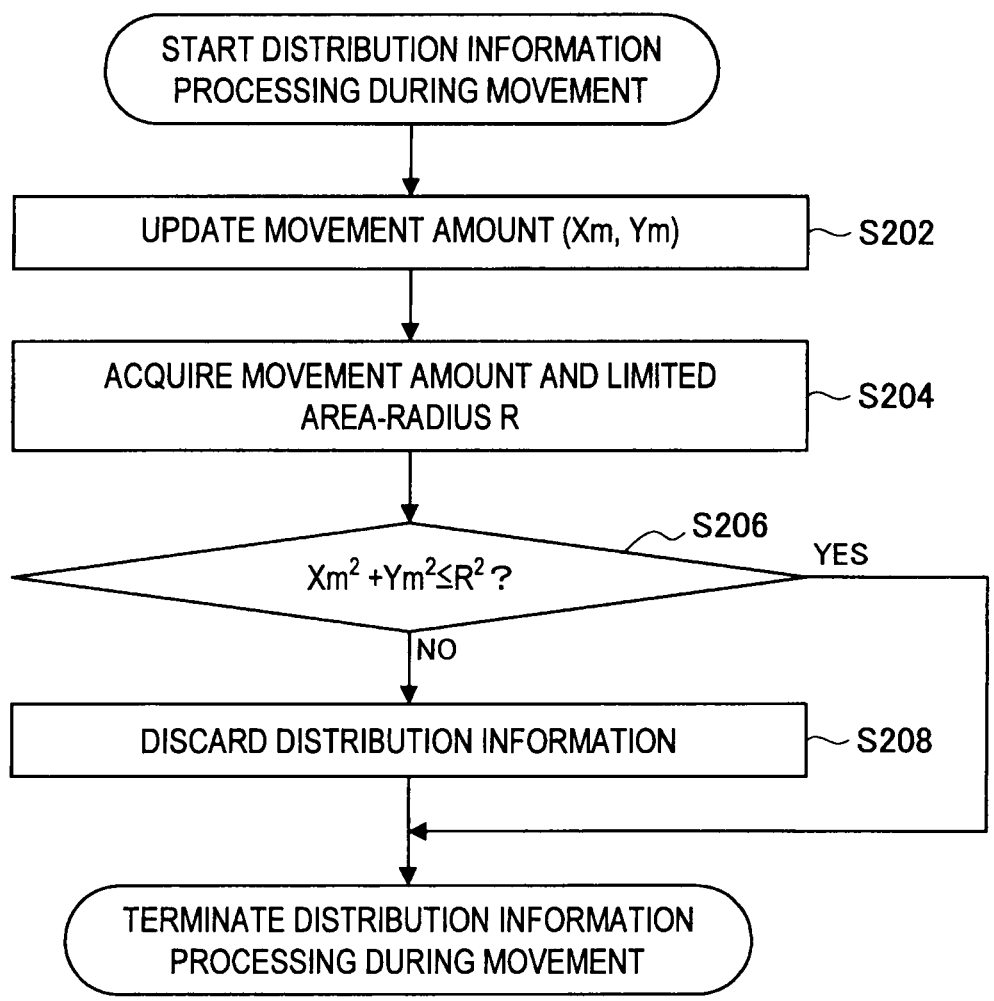
FIG. 12 is a flowchart showing distribution information processing during movement.
Figure 13:
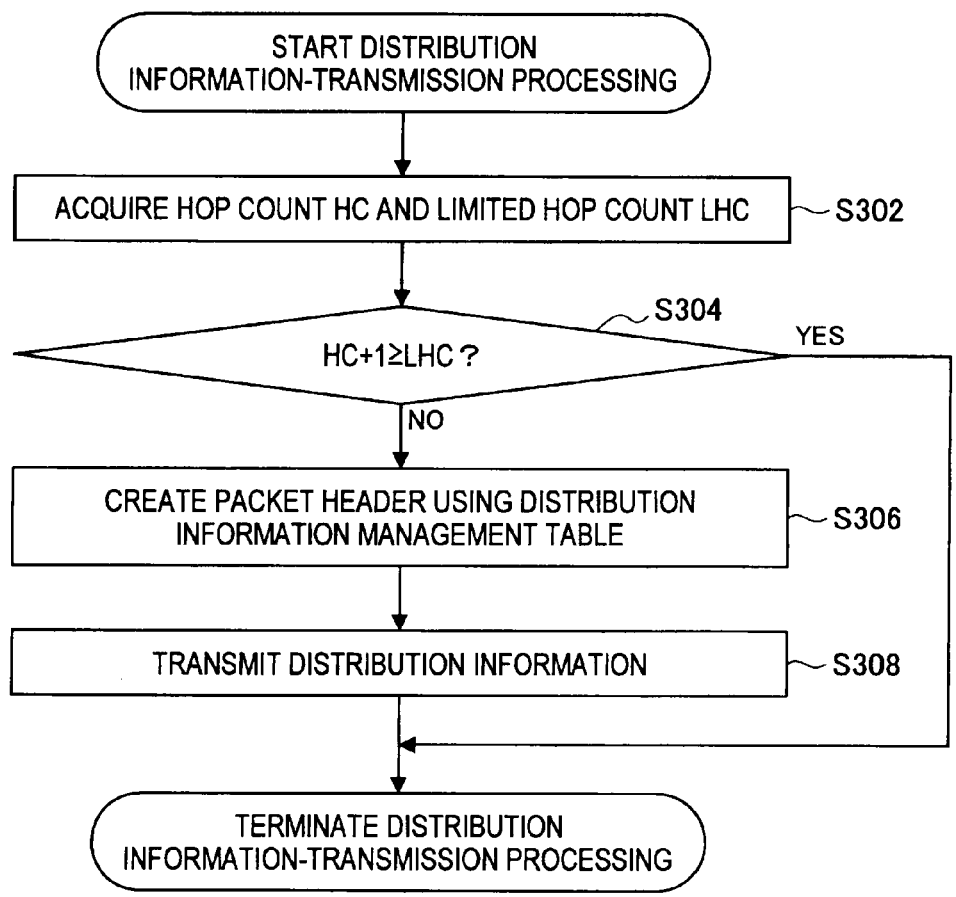
FIG. 13 is a flowchart showing processing of transmitting the distribution information.

FIG. 9 is a flowchart showing reception processing operation at the time at which a node 100 receives distribution information. FIG. 10 is an explanatory diagram showing an example of a header configuration of the distribution information. FIG. 11 is an explanatory diagram showing an example of a distribution information management table. FIG. 12 is a flowchart showing operation of distribution information operation performed at the time at which the node 100 moves after receiving the distribution information. FIG. 13 is a flowchart showing transmission processing operation at the time at which the node 100 transmits the distribution information.

(Reception Processing)

First, with reference to FIG. 9, reception operation in the node 100 will be described. First, in the node 100, when the communication section receives distribution information 2000 from another node 100 using pass-by communication (S102), the distribution information management section 152 acquires transmission-source X-Y values (Xs, Ys) and a value of a limited area-radius R from the header of the received distribution information 2000 (S104). Here, an example of values stored in the header part of the received distribution information is shown in FIG. 10. From here, the transmission-source X-Y values (Xs, Ys) and the value of the limited area-radius R are acquired.

After that, the distribution information management section 152 determines whether or not the transmission-source X-Y values (Xs, Ys)=(0, 0) is satisfied (S106). When the transmission-source X-Y values (Xs, Ys)=(0, 0) is satisfied, it means that the information distribution device 200, which is a transmission source, does not have a function of detecting an absolute position.

In the case where it is determined in Step S106 that (Xs, Ys)=(0, 0) is satisfied, the processing of receiving the distribution information is terminated. On the other hand, in the case where it is determined in Step S106 that (Xs, Ys)=(0, 0) is not satisfied, then, the distribution information management section 152 determines whether or not the node which executes the distribution information-reception processing is capable of detecting the absolute position (S108). In the case where it is determined in Step S108 that the node which executes the distribution information-reception processing is not capable of detecting the absolute position, the processing of receiving the distribution information is terminated. On the other hand, in the case where it is determined in Step S108 that the node which executes the distribution information-reception processing is capable of detecting the absolute position, the position information acquisition section detects a current position, which is represented by reception X-Y values (Xr, Yr) (S110).

After that, in the distribution information management section 152, whether or not the expression written in Step S112 is satisfied is determined. When the expression is satisfied, it means that the distribution information is in the range of the limited area. Accordingly, in the case where it is determined in Step S112 that the expression is satisfied, the distribution information management section 152 stores the distribution information in a usable state (S114), and creates a distribution information management table (S116).

Here, an example of a distribution information management table 500 will be described with reference to FIG. 11. In the distribution information management table 500, there are stored the values of transmission-source X-Y values (Xs, Ys), reception X-Y values (Xr, Yr), movement amount (Xm, Ym), hop count HC, limited area-radius R, and limited hop count LHC. Of those, the values of the transmission-source X-Y values (Xs, Ys), the limited area-radius R, and the limited hop count LHC are stored by acquiring values stored in the header of the distribution information 2000 at the information distribution device 200 which is a transmission source. Further, the distribution information management section 152 stores the values detected in Step S110 as the reception X-Y values (Xr, Yr). In the case where the processing of Step S110 is not executed, (0, 0) is stored as the reception X-Y values. Further, as for the movement amount, a value calculated by the movement amount calculation section 153 is stored. Then, as for the hop count, a value stored in the header is stored as it is.

That is, when the distribution information is received, it is only in the case where both the information distribution device 200 which is a transmission source and the node 100 are capable of acquiring the position information by absolute position detection that it can be determined whether or not the distribution information 2000 received at that time point is available, that is, whether or not the distribution information 2000 is in the range of the limited area.

(Distribution Information Processing During Movement)

First, the node 100 updates the movement amount (Xm, Ym) by the movement amount calculation section 153 (S202). After that, the distribution information management section 152 acquires values of the movement amount (Xm, Ym) and the limited area-radius R from the distribution information management table 500 (S204).

The distribution information management section 152 determines, by using the acquired values, whether or not $Xm^2+Ym^2 \leq R^2$ is satisfied (S206). Then, in Step S206, in the case where the acquired value does not satisfy the expression, that is, in the case where it is determined that the distribution information 2000 is outside the range of the limited area, the distribution information is discarded (S208).

The processing shown in FIG. 12 is regularly executed in this way, and hence, the distribution information 2000 can be discarded in the case where the position of the distribution information 2000 is outside the range of the limited area.

(Transmission Processing)

Next, with reference to FIG. 13, description will be made on operation of the node 100 when transmitting the distribution information 2000 to another node 100.

First, the node 100 acquires, in the case where another node 100 which requests acquisition of distribution information 2000 is present in the vicinity thereof, values of the hop count HC and the limited hop count LHC from the distribution information management table 500 (S302).

After that, the distribution information management section 152 determines whether or not the acquired values satisfy the relationship of HC+1≥LHC (S304). In the case where the expression is satisfied, it means that the hop count exceeds a predetermined limited hop count, therefore, the node 100 terminates the transmission processing without transmitting the distribution information 2000 to the other node 100. On the other hand, in the case where it is determined in Step S304 that the expression is satisfied, the distribution information management section 152 creates a packet header of the distribution information 2000 by using the value stored in the distribution information management table (S306), and causes the communication section to transmit the distribution information 2000 (S308).

5. Distribution Example

Next, in the information distribution system 1 described above, description will be made with reference to FIGS. 14 to 21 on four patterns (first to fourth distribution examples) in which the modes of acquiring position information of respective nodes 100 and a information distribution device 200 are different from each other, in terms of transition of data which the information distribution device 200 stores in the header of distribution information and values in the distribution information management table managed by each node 100.

First, in the first distribution example which will be described by using FIGS. 14 and 15, all the information distribution device 200 and nodes 100 included in the information distribution system are devices which detect absolute positions. Further, in the second distribution example which will be described by using FIGS. 16 and 17, all the information distribution device 200 and nodes 100 included in the information distribution system are devices which detect relative positions. In addition, in the third distribution example and the fourth distribution example which will be described by using FIGS. 18 to 21, devices which detect absolute positions and devices which detect relative positions are mixed in the information distribution system.

In the first to fourth distribution examples which will be described below, the following operation is performed in common. That is, distribution information 2000 is distributed from an information distribution device 200 to a node 100A and a node 100B at time t0, and the node 100B, which has received the distribution information 2000, physically moves. The node 100B, which has moved to the position within a range in which pass-by communication can be performed with the node 100C at time t1, transmits the distribution information 2000 using pass-by communication to a node 100C.

5-1. First Distribution Example

Figure 14:
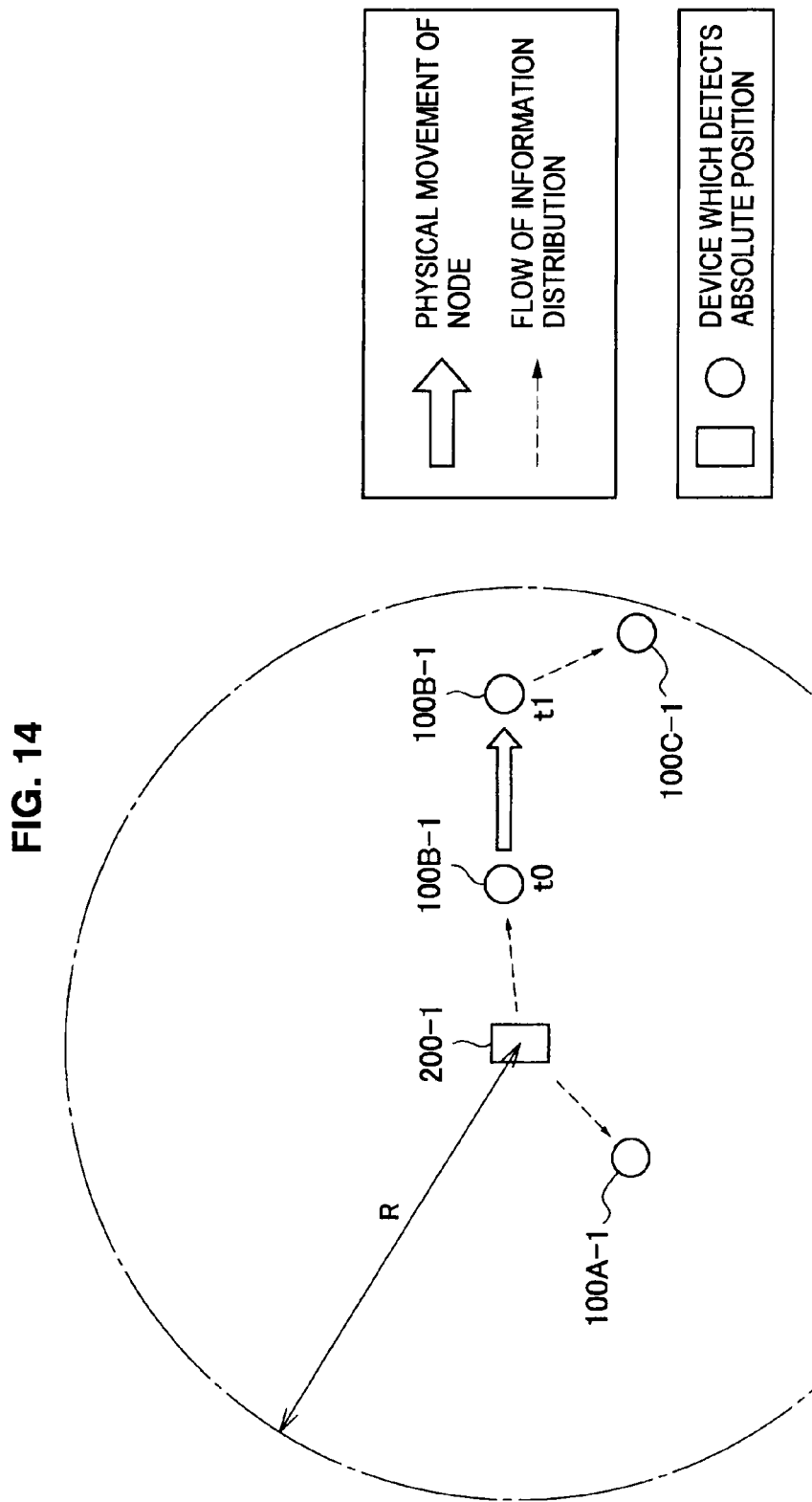
FIG. 14 is an explanatory diagram showing an outline of a first distribution example.

FIG. 14 is a schematic view of the first distribution example of the information distribution system according to an embodiment of the present invention. In addition, FIG. 15 is an explanatory diagram illustrating transition of values managed by respective devices in the same distribution example.

In a table 1200 shown in FIG. 15, there are stored values of node 1102, time 1104, transmission-source X-Y values 1106, reception X-Y values 1108, movement amount 1110, hop count 1112, limited area-radius 1114, and limited hop count 1116. Here, FIG. 15 shows values in one table 1200 in order to describe transition of each of the values, but the values shown in the table 1200 are actually managed in the devices of the information distribution device 200 and the nodes 100, respectively. That is, data 1202 shown in a row of the table 1200 represents each of the values of an information distribution device 200-1 at time t0. Further, data 1204 to data 1210 represent values of the nodes 100 shown in the node 1102 column at the time shown in the time 1104 column, respectively. Note that the colored parts in the table 1200 indicate that the values of the colored parts are updated at the time.

First, the information distribution device 200-1 stores values of the transmission-source X-Y values, the limited area-radius, and the limited hop count in the header of the distribution information 2000. At that time, since the information distribution device 200-1 has a function of detecting an absolute position, the information distribution device 200-1 stores, in the transmission-source X-Y values, the information of the absolute position acquired by the position information acquisition section thereof. Then, as for the limited area-radius and the limited hop count, the information distribution device 200-1 stores predetermined values. In addition, as for the hop count, an initial value of hop count 0 is stored in the header at the information distribution device 200 which is a distribution source of the distribution information 2000.

The distribution information 2000 having such header information is distributed to a node 100A-1 and a node 100B-1 at time t0. The node 100A-1 and the node 100B-1 which have received the distribution information 2000 each acquire the transmission-source X-Y values, the movement amount, the hop count, the limited area-radius, and the limited hop count from the header of the distribution information 2000. Then, the node 100A-1 and the node 100B-1 each store the values of the following as they are acquired in the distribution information management table: the transmission-source X-Y values, the movement amount, the limited area-radius, and the limited hop count.

Then, the node 100A-1 and the node 100B-1 acquire an absolute position of the node 100A-1 and an absolute position of the node 100B-1, respectively, by using respective position information acquisition sections, and store the absolute positions in the reception X-Y values in the distribution information management table.

Further, as for the hop count, a value obtained by adding 1 to the value acquired from the header of the distribution information 2000 is stored in the distribution information management table.

After that, the node 100B-1 that performs physical movement regularly updates the value of the movement amount in the distribution information management table. At that time, the movement amount at time t ($Xm[t], Ym[t]$) is represented by the following expression, where the absolute position of the node at time t is represented by ($X[t], Y[t]$).

$$Xm[t]=X[t]-Xs$$

$$Ym[t]=Y[t]-Ys \quad \text{[Expression 5]}$$

The node 100B-1 manages availability of the distribution information by using the value of the movement amount that is updated regularly. That is, whether or not the current position of the node 100B-1 is in the range of the limited area is determined from the value of the movement amount, and when the current position of the node 100B-1 is outside the range of the limited area, the distribution information 2000 is discarded.

Then, the node 100B-1 generates a header of the distribution information using the transmission-source X-Y values, the movement amount, the hop count, the limited area-radius, and the limited hop count, the values of which are stored in the distribution information management table, and transmits the distribution information 2000 including such header information to a node 100C-1.

The node 100C-1 which has received the distribution information 2000 from the node 100B-1 acquires the transmission-source X-Y values, the movement amount, the hop count, the limited area-radius, and the limited hop count from the received header of the distribution information 2000. Then, the node 100C-1 stores the values of the following as they are acquired in the distribution information management table: the transmission-source X-Y values, the movement amount, the limited area-radius, and the limited hop count.

Then, the node 100C-1 acquires an absolute position of the node 100C-1 by using the position information acquisition section, and stores the absolute position in the reception X-Y values in the distribution information management table. Further, as for the hop count, a value obtained by adding 1 to the value acquired from the header of the distribution information 2000 is stored in the distribution information management table.

5-2. Second Distribution Example

Figure 16:
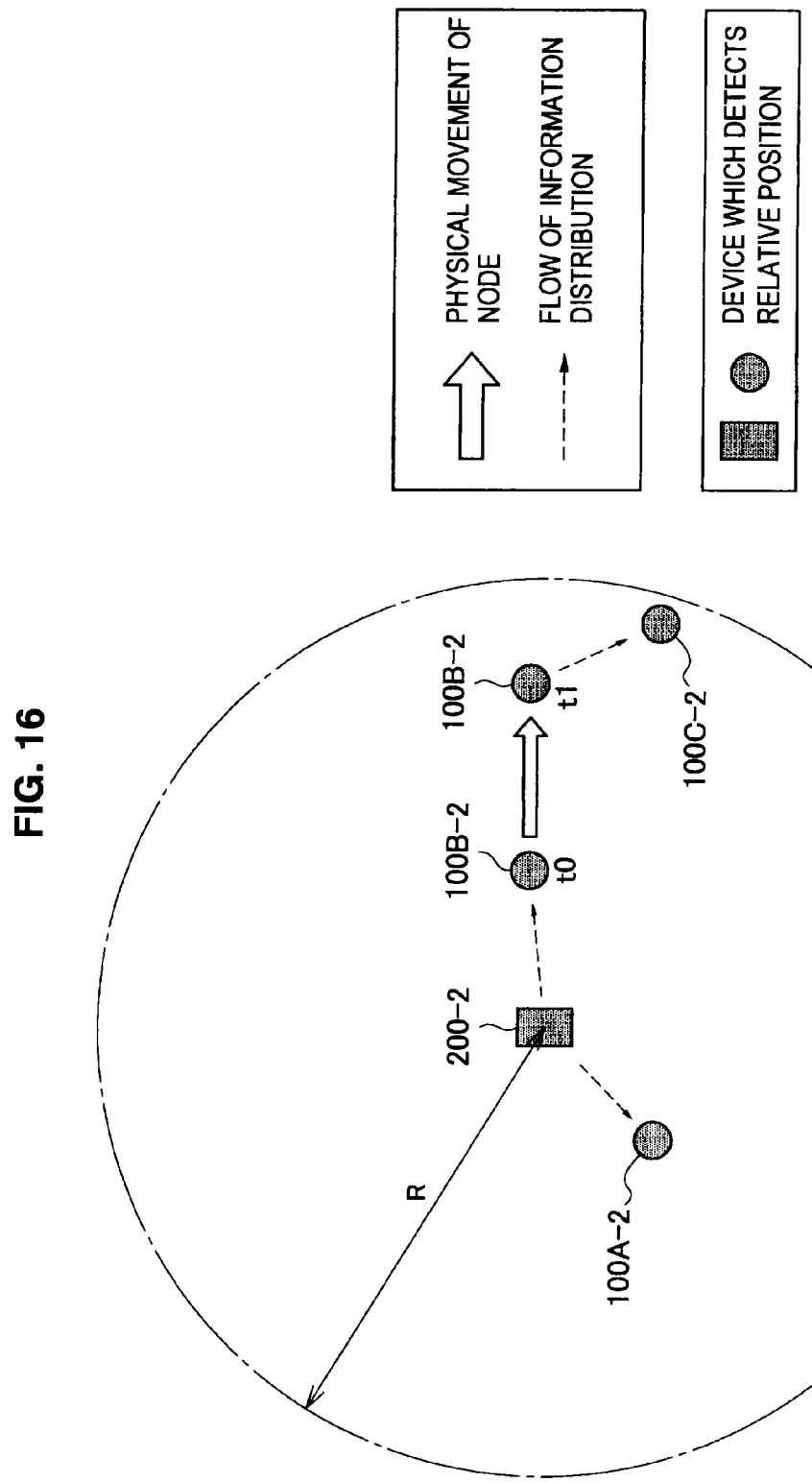
FIG. 16 is an explanatory diagram showing an outline of a second distribution example.

FIG. 16 is a schematic view of the second distribution example of the information distribution system according to an embodiment of the present invention. In addition, FIG. 17 is an explanatory diagram illustrating transition of values managed by respective devices in the same distribution example.

The information distribution system according to the second distribution example differs from the information distribution system according to the first distribution example in that all information distribution device 200 and nodes 100 detect relative positions. Hereinafter, only the differences with the first distribution example will be described, and description on the same parts therewith will be omitted.

In the information distribution system according to the second distribution example, the timing or the like at which each value shown in a table 1400 of FIG. 17 is updated is the same as that in the case of the first distribution example. The manner of updating each of the values of the transmission-source X-Y values, the reception X-Y values, and the movement amount differs from the manner in the case of the first distribution example, the difference being attributed to the difference in modes of detecting position information.

First, an information distribution device 200-2 has a function of detecting relative position. Accordingly, (0, 0) are used as the transmission-source X-Y values. The values are not limited to (0, 0) and other values may be used, and it is preferred to use values indicating a place which humans generally do not step in. That is, in the information distribution system according to the present embodiment, it is detected that a relative position is being detected based on those values. Therefore, it is preferred that the values are those which are rarely detected by the absolute position detection.

Further, (0, 0) are also stored as the reception X-Y values, in the case where the reception device is a device which detects a relative position.

Then, movement amount is obtained by accumulating, to a value of the movement amount stored in the header of the distribution information 2000 at the time of receiving the distribution information 2000, amount(s) of change from the position at which the distribution information 2000 is received to a current position.

That is, in a node 100B-2 which has received the distribution information 2000 from the information distribution device 200-2, the movement amount is obtained by accumulating, to the value of the movement amount (0, 0) stored in the header of the distribution information 2000, amount(s) of change from the position at time $t_0$ at which the distribution information 2000 is received to a current position at current time t. That is, when a movement amount at time t is represented by (Xm[t], Ym[t]), the movement amount is represented by the following expression.

$$Xm[t] = Xm[t_0] + \sum_{T=t_0}^{t} (x[T])$$

$$Ym[t] = Ym[t_0] + \sum_{T=t_0}^{t} (y[T])$$

[Expression 6]

Here, since $Xm[t_0]=0$ and $Ym[t_0]=0$ are satisfied, when a movement amount at time $t_1$ is represented by $(Xm[t_1], Ym[t_1])$, the movement amount is represented by the following expression.

$$Xm[t_1] = 0 + \sum_{T=t_0}^{t_1} (x[T])$$

$$Ym[t_1] = 0 + \sum_{T=t_0}^{t_1} (y[T])$$

[Expression 7]

Further, a node 100C-2, which has received the distribution information 2000 from the node 100B-2, acquires the transmission-source X-Y values, the movement amount, the hop count, the limited area-radius, and the limited hop count from the header of the distribution information 2000. Then, the node 100C-2 stores the values of the following as they are acquired in the distribution information management table: the transmission-source X-Y values, the movement amount, the limited area-radius, and the limited hop count.

Then, since the node 100C-2 detects a relative position, the node 100C-2 stores (0, 0) as the reception X-Y values in the distribution information management table. Further, as for the hop count, a value obtained by adding 1 to the value acquired from the header of the distribution information 2000 is stored in the distribution information management table.

Note that, although not shown, in the case where the node 100C-2 performs physical movement after receiving the distribution information 2000, availability of the distribution information 2000 is determined while the value of the movement amount is being updated in the same manner as the node 100B-2. To be specific, the node 100C-2 accumulates, to the value of the movement amount $(Xm[t_1], Ym[t_1])$ included in the header of the distribution information 2000, position(s) from the position at time $t_1$ at which the distribution information 2000 is received to a current position at current time t, and updates the movement amount with the obtained values.

That is, since the time at which the distribution information 2000 is received is time $t_1$, the movement amount of the node 100C-2 at time t are represented by the following expression.

$$Xm[t] = Xm[t_1] + \sum_{T=t_0}^{t} (x[T])$$

$$Ym[t] = Ym[t_1] + \sum_{T=t_0}^{t} (y[T])$$

[Expression 8]

5-3. Third Distribution Example

Next, the third distribution example will be described by using FIGS. 18 and 19. FIG. 18 is a schematic view of the third distribution example of the information distribution system according to an embodiment of the present invention. In addition, FIG. 19 is an explanatory diagram illustrating transition of values managed by respective devices in the same distribution example.

The third distribution example is a distribution example in the case where both the device which detects an absolute position and the device which detects a relative position are present. In the third distribution example, only a node 100B detects a relative position, and an information distribution device 200, a node 100A, and a node 100C each detect an absolute position.

Also in the present distribution example, the timing or the like at which each value shown in a table 1600 of FIG. 19 is updated is the same as that in the case of the first distribution example. The manner of updating each of the values of the transmission-source X-Y values, the reception X-Y values, and the movement amount differs from the manner in the case of the first distribution example, the difference being attributed to the difference in modes of detecting position information. Accordingly, the difference will be described, and description on the same parts with the first distribution example will be omitted.

In the present distribution example, since an information distribution device 200-1 detects an absolute position, the transmission-source X-Y values are represented by (Xs, Ys), which use information of the absolute position detected by the information distribution device 200-1 using the position information acquisition section.

Further, in the case where a node 100 which has received the distribution information 2000 detects an absolute position, that is, in a node 100A-1, for example, the reception X-Y values are represented by (Xr[A], Yr[A]) which indicate an absolute position detected by the absolute position detection. In the case where a node 100 which has received the distribution information 2000 detects a relative position, that is, in a node 100B-2, for example, the reception X-Y values are represented by (0, 0).

Further, since the node 100B-2 detects a relative position, the movement amount is represented by the following expression in the same manner as the second distribution example.

$$Xm[t_1] = 0 + \sum_{T=t_0}^{t_1} (x[T])$$

$$Ym[t_1] = 0 + \sum_{T=t_0}^{t_1} (y[T])$$

[Expression 9]

Further, although not shown, in the case where a node 100C-1 performs physical movement after receiving the distribution information 2000, the movement amount is updated. At that time, since the node 100C-1 detects an absolute position and the values obtained by the absolute position detection are stored as the transmission-source X-Y values, the movement amount at time t is represented by the following expression in the same manner as the first distribution example, where a current position of the node 100C-1 at time t is represented by (X[t],Y[t]).

$$Xm[t]=X[t]-Xs$$

$$Ym[t]=Y[t]-Ys$$

[Expression 10]

5-4. Fourth Distribution Example

Figure 20:
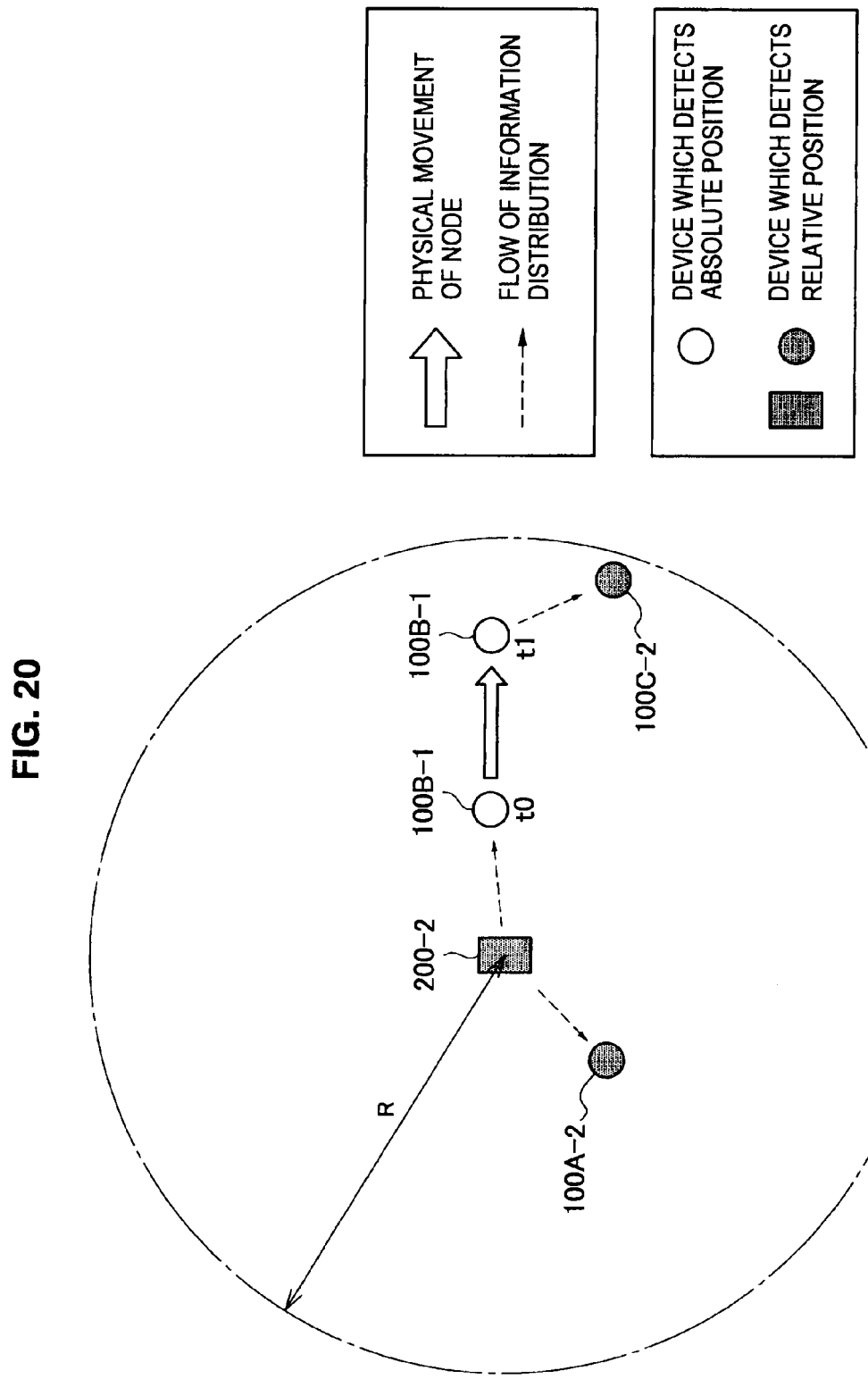
FIG. 20 is an explanatory diagram showing an outline of a fourth distribution example.

Next, the fourth distribution example will be described by using FIGS. 20 and 21. FIG. 20 is a schematic view of the fourth distribution example of the information distribution system according to an embodiment of the present invention. In addition, FIG. 21 is an explanatory diagram illustrating transition of values managed by respective devices in the same distribution example.

The fourth distribution example is a distribution example in the case where both the device which detects an absolute position and the device which detects a relative position. In the fourth distribution example, only a node 100B uses the absolute position detection, and an information distribution device 200, a node 100A, and a node 100C each detect a relative position.

Also in the present distribution example, the timing or the like at which each value shown in a table 1800 of FIG. 21 is the same as that in the case of the first distribution example. The manner of updating each of the values of the transmission-source X-Y values, the reception X-Y values, and the movement amount differs from the manner in the case of the first distribution example, the difference being attributed to the difference in modes of detecting position information. Accordingly, the difference will be described, and description on the same parts with the first distribution example will be omitted.

In the present distribution example, since an information distribution device 200-2 detects a relative position, (0, 0) are stored as the transmission-source X-Y values. Then, as for the reception X-Y values, values corresponding to the position detection mode of the node which has received the distribution information 2000 are stored.

Further, in the node 100B-1, the value of the movement amount in the distribution information management table is updated at the time of reception, using the values stored in the header of the distribution information 2000. Then, when the node 100B-1 performs physical movement, the node 100B-1 updates the movement amount by using the following expression. That is, in the present distribution example, since the information distribution device 200-2 which is a distribution source of the distribution information detects a relative position, the movement amount of the node 100B-1 is represented by the following expression, based on the position (Xr[$t_0$], Yr[$t_0$]) at which the node 100B-1 has received the distribution information 2000, the value of the movement amount (Xm[$t_0$], Ym[$t_0$]) included in the header of the distribution information 2000, and the current position (X[t], Y[t]) of the node 100B-1 at time t.

$$Xm[t]=Xm[t_0]+(X[t]-Xr[t_0])$$

$$Ym[t]=Ym[t_0]+(Y[t]-Yr[t_0])$$

[Expression 11]

6. Applicable Condition

Last of all, preferred conditions to which an embodiment of the present invention is applied will be described. The information distribution system 1 according to an embodiment of the present invention can be applicable when the nodes 100 and the information distribution device 200 are each either a device having a function of detecting an absolute position or a device having a function of detecting a relative position.

However, in the case of the device having a function of detecting a relative position detection, there may occur a situation where, as has been described with reference to FIG. 6, it is difficult to appropriately map the range of the limited area of the distribution information. Accordingly, in the case of applying the embodiment of the present invention, it is desirable that the embodiment of the present invention is applied to the system which satisfies the following conditions.

First, it is desirable that a limited area-radius R be sufficiently larger than a communication distance Lc of pass-by communication (R>>Lc). For example, it is preferred that, specifically, the communication distance Lc of the pass-by communication be several tens of meters when the limited area-radius R is several kilometers.

Figure 22:
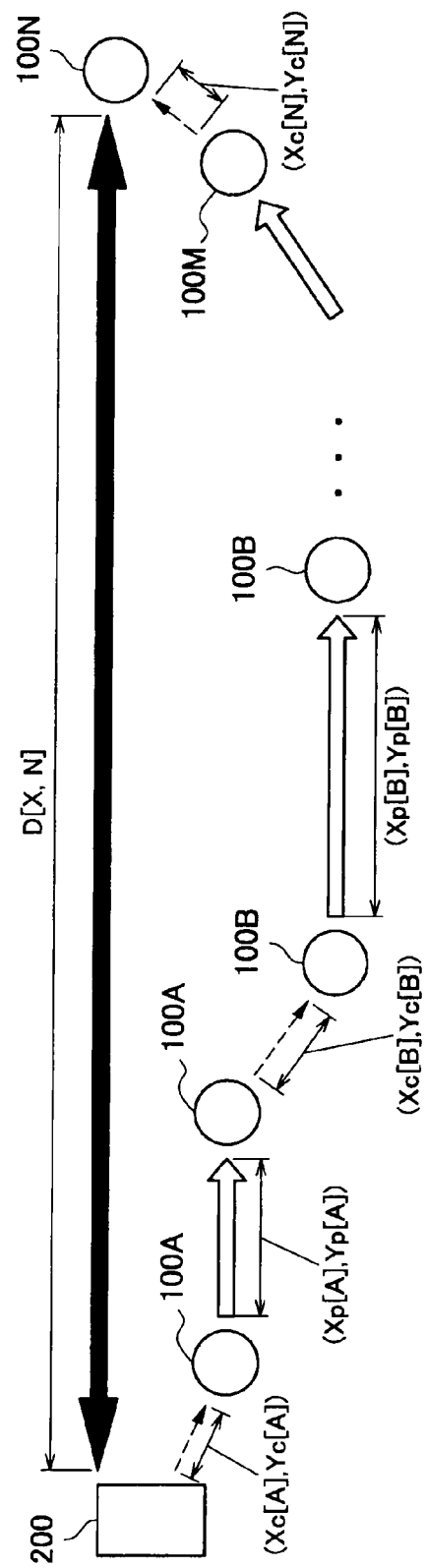
FIG. 22 is an explanatory diagram illustrating a preferable applicable condition.
Figure 23:
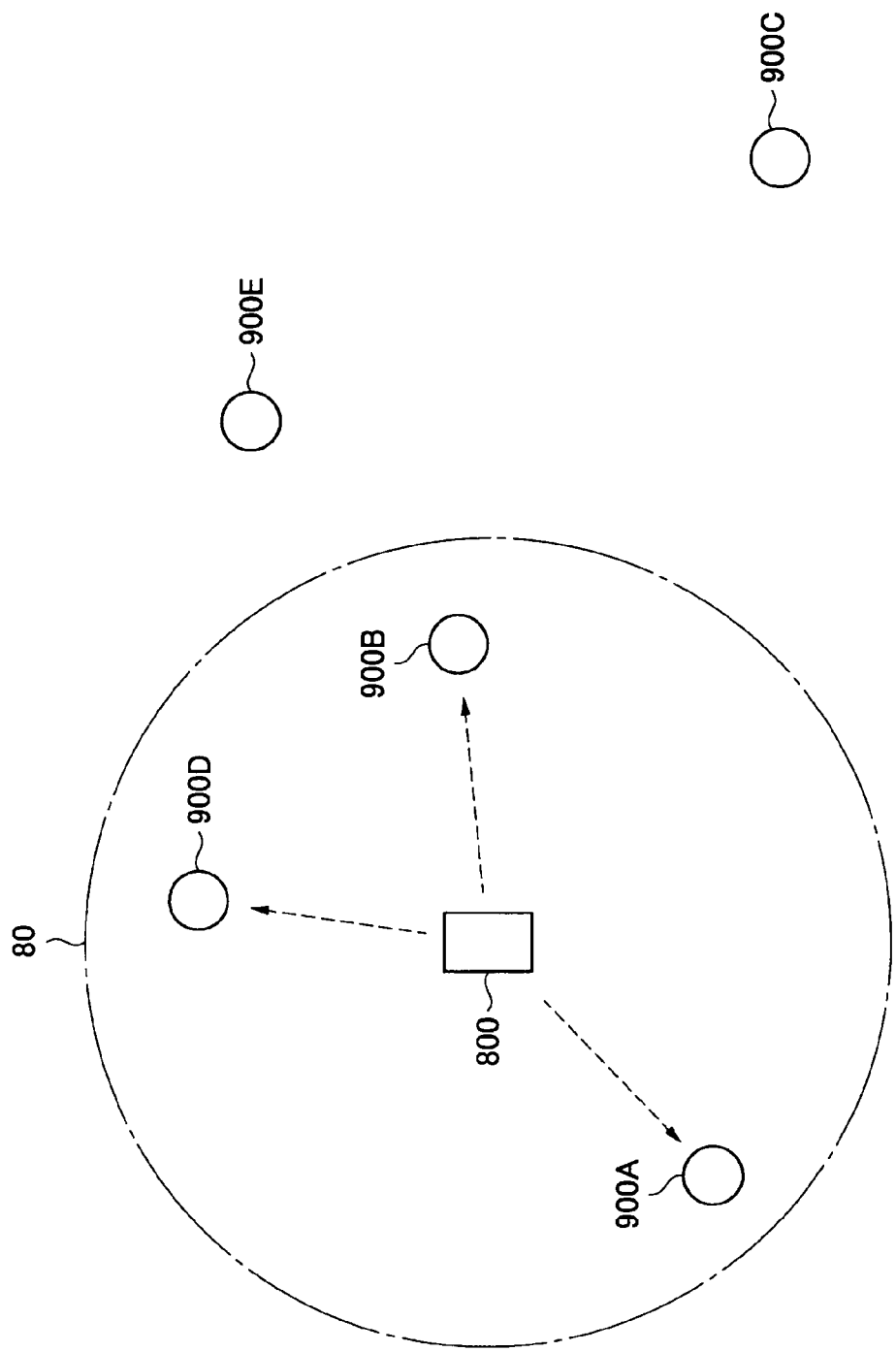
FIG. 23 is an explanatory diagram showing an example of an information distribution system of the past.
Figure 24:
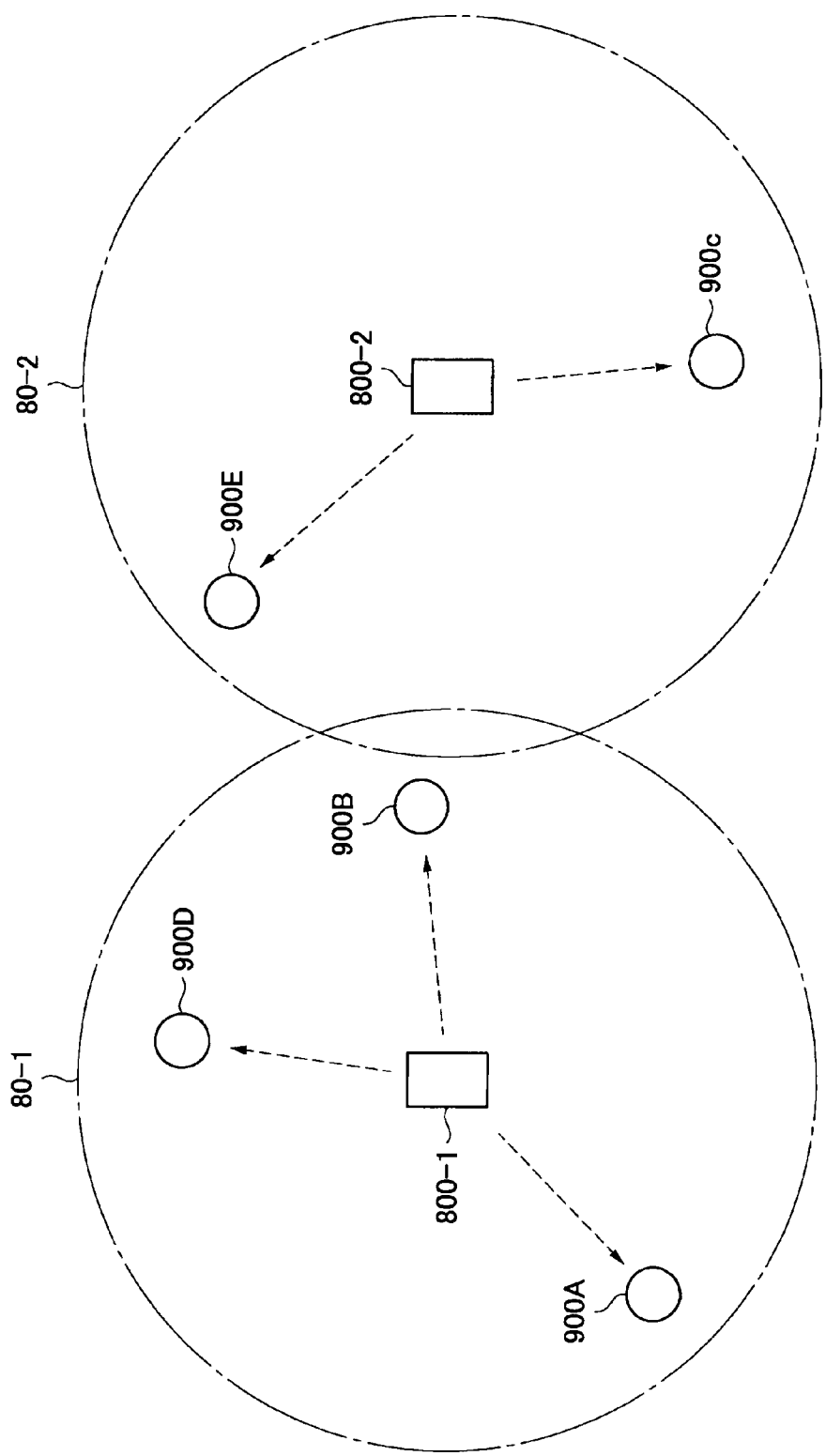
FIG. 24 is an explanatory diagram showing a modified example of the information distribution system of the past.
Figure 25:
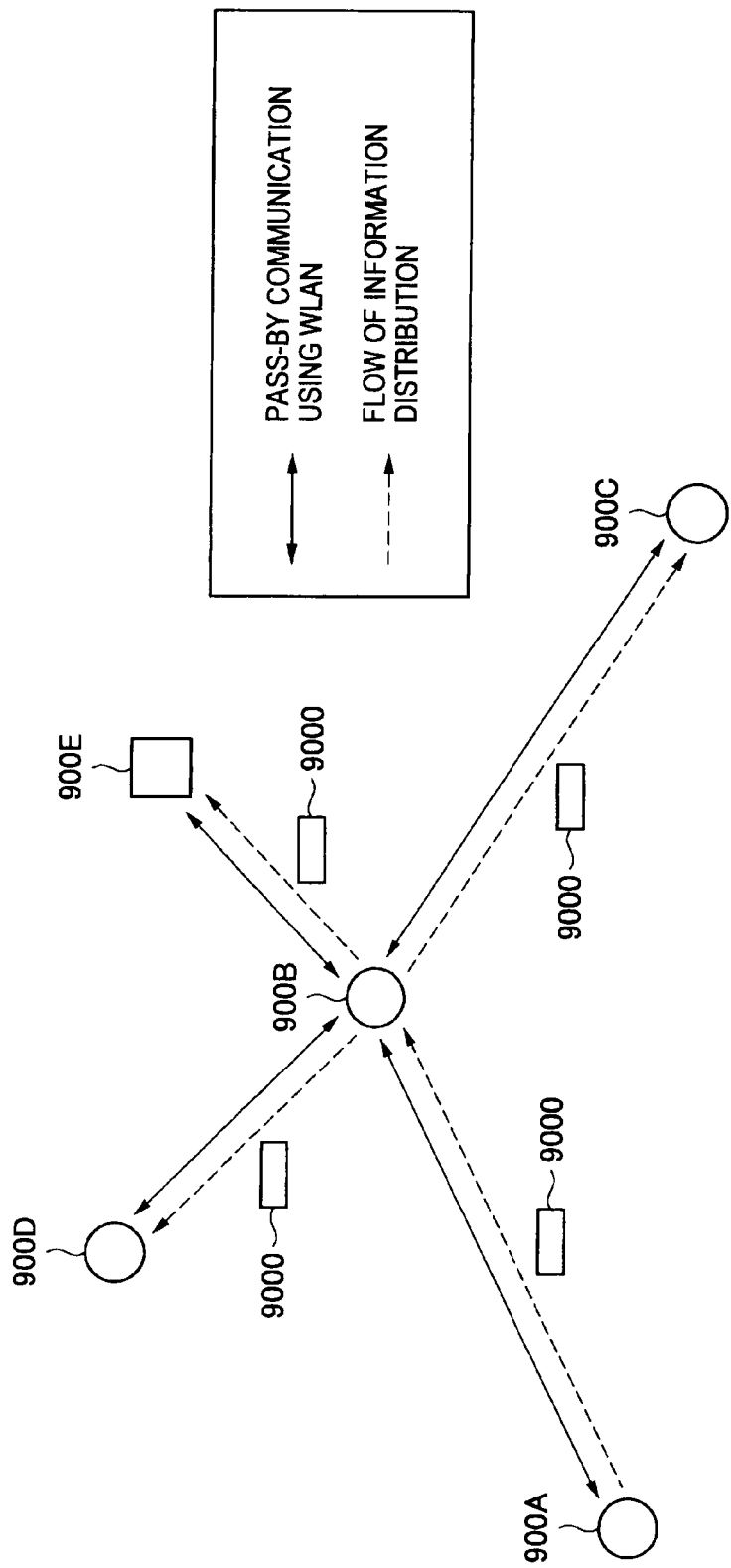
FIG. 25 is an explanatory diagram showing an example of information distribution using pass-by communication of the past.
Figure 26:
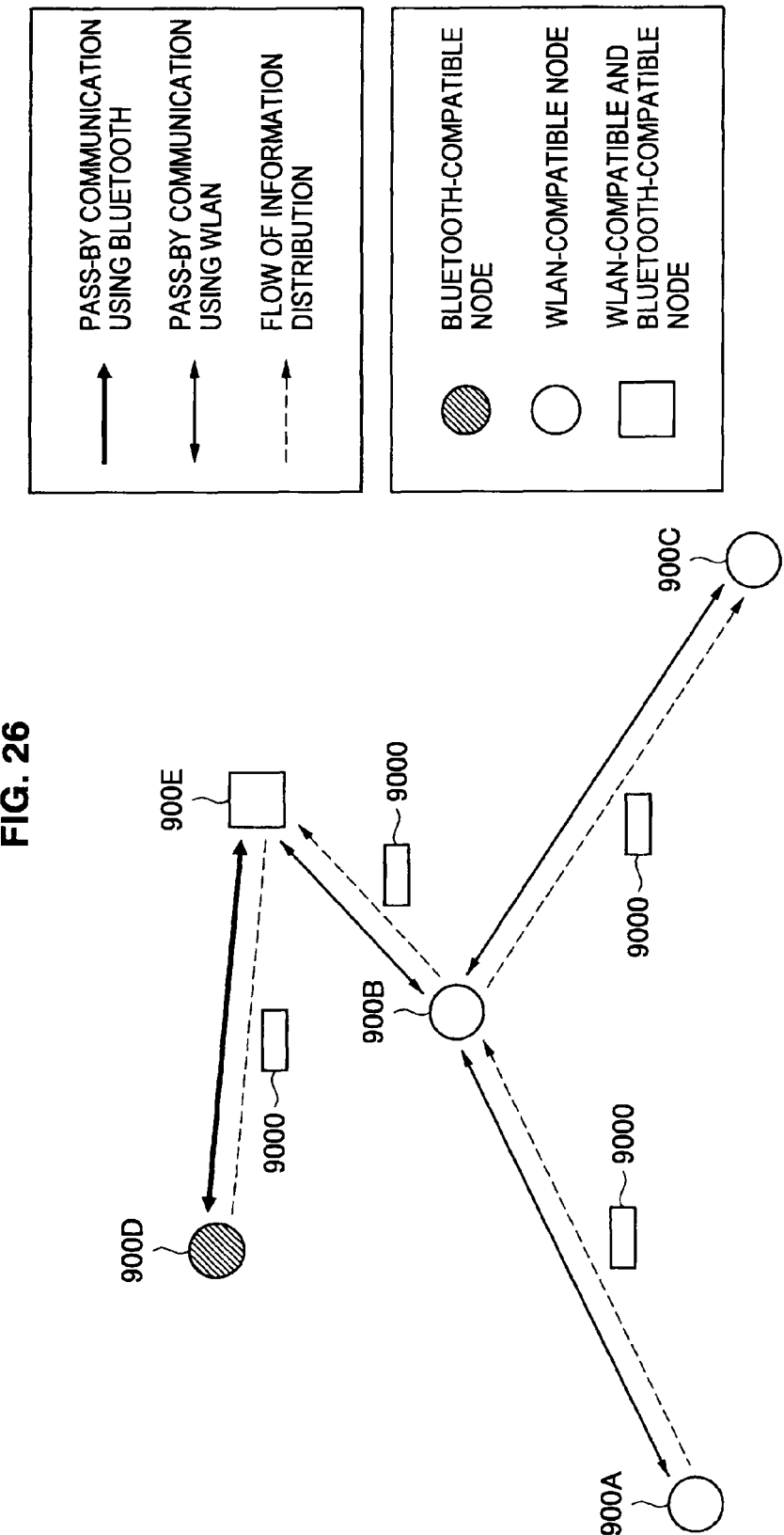
FIG. 26 is another example of information distribution using the pass-by communication of the past.

Further, as for the movement amount of the distribution information, it is preferred to use a system in which the physical movement distances of a node is dominant. That is, in the case as shown in FIG. 22, for example, preferred is a system which satisfies the following expression with respect to a node 100N, where, when a movement amount of distribution information using the pass-by communication to a node 100X is represented by (Xc[X], Yc[X]), (Xp[X], Yp[X]) represents the movement amount of the distribution information by physical movement of the node 100X, and D[X, Y] represents physical distance between the node 100X and a node 100Y. That is, in the example shown in FIG. 22, it is shown that the system is in the situation that nodes 100 which are capable of executing the pass-by communication are not closely located with each other.

$$D[X, N] \cong \sqrt{\left\{\left(\sum_{n=A}^{N} (Xp[n])\right)^2 + \left(\sum_{n=A}^{N} (Yp[n])\right)^2\right\}} \quad \text{[Expression 12]}$$

7. Examples of Effects

As described above, the information distribution system 1 according to the present embodiment can realize information distribution limited to the places of the real world while expanding the area in which information is distributed using ad hoc wireless communication, by using pass-by communication and position detection technologies.

At that time, by using the pass-by communication, the information distribution area can be expanded without increasing the number of the information distribution devices 200. In addition, in the pass-by communication, since a user can transmit information without explicitly performing operation, the information distribution area can be expanded without creating extra work for the user.

In the pass-by communication, when a device that supports multiple wireless communication standards is present in a system, the same information can be distributed, via the device, between devices that support different wireless communication standards. Consequently, the pass-by communication can support multiple wireless communication standards, and can build a highly flexible information distribution system.

Since it is possible to expand the distribution area while limiting the range of the information distribution, the distribution area can be expanded without losing preciousness of the distribution information. Particularly in recent years, in the field of games of portable game devices, information distribution has been actively performed, in which the distribution range of the information is limited and the value of the information is enhanced. For example, there are many game fans who come to a game show venue seeking an item for an avatar that can be only obtained at the game show venue. When the information distribution system 1 according to the present embodiment is applied thereto, information can be distributed via a node that a user carries, not by increasing the number of the information distribution devices 200.

Further, the information distribution system 1 according to the present embodiment can use a node having a function of detecting an absolute position and can also use a node having a function of detecting a relative position. Therefore, it is possible to build a system using various types of terminal devices, and it can be expected that the range of application thereof is expanded.

It should be understood by those skilled in the art that various modifications, combinations, sub-combinations and alterations may occur depending on design requirements and other factors insofar as they are within the scope of the appended claims or the equivalents thereof.

For example, in the embodiment described above, the information distribution device 200 necessarily has either the function of detecting an absolute position or the function of detecting a relative position, but the embodiment of the present invention is not limited to such an example. For example, the information distribution device 200 may not have a position detection function. Also in this case, that is, in the case of not having the position detection function, transmission-source X-Y values are set to (0, 0).

Further, in the embodiment described above, the node 100 confirms whether or not the hop count exceeds the limited hop count before transmission, but the embodiment of the present invention is not limited to such an example. For example, the node 100 may confirm the hop count at the time of reception.

Note that in the present specification, the steps written in the flowchart may of course be processed in chronological order in accordance with the stated order, but may not necessarily be processed in the chronological order, and may be processed individually or in a parallel manner. It is needless to say that, in the case of the steps processed in the chronological order, the order of the steps may be changed appropriately according to circumstances.

The present application contains subject matter related to that disclosed in Japanese Priority Patent Application JP 2010-075333 filed in the Japan Patent Office on Mar. 29, 2010, the entire content of which is hereby incorporated by reference.

What is claimed is:

1. A wireless communication device comprising:
   a communication section which receives, from an information distribution device that distributes distribution information or another wireless communication device that has received the distribution information, the distribution information using ad hoc wireless communication;
   a position information acquisition section which acquires position information indicating a current position;
   a movement amount calculation section which calculates a movement amount from the information distribution device based on a change in the position information acquired by the position information acquisition section; and
   a distribution information management section which manages availability of the distribution information based on the movement amount and a predetermined limited area-radius that defines a limited area in which the distribution information is distributed,
   wherein the movement amount calculation section updates, after the communication section has received the distribution information, the movement amount at predetermined time intervals, and
   wherein the distribution information management section periodically determines the availability of the distribution information based on a hop count from the information distribution device and the updated movement amount, based on the predetermined time intervals.

2. The wireless communication device according to claim 1,
   wherein the distribution information management section determines the availability of the distribution information at least at a time at which the communication section receives the distribution information.

3. The wireless communication device according to claim 1,
   wherein the position information acquisition section acquires position information indicating an absolute position, and
   wherein, when the information distribution device does not have a function of detecting an absolute position, the movement amount calculation section calculates the movement amount from the information distribution device by adding a difference between position information at a time point of receiving the distribution information and position information at a current time point to a movement amount at the time point of receiving the distribution information.

4. The wireless communication device according to claim 1,
wherein the communication section uses pass-by communication for communication with another wireless communication device.

5. An information distribution system comprising:
an information distribution device which distributes distribution information; and
a wireless communication device which receives, from the information distribution device or another wireless communication device that has received the distribution information, the distribution information using ad hoc wireless communication,
wherein the wireless communication device includes
a communication section which receives the distribution information,
a position information acquisition section which acquires position information indicating a current position,
a movement amount calculation section which calculates a movement amount from the information distribution device based on a change in the position information acquired by the position information acquisition section, and
a distribution information management section which manages availability of the distribution information based on the movement amount and a predetermined limited area-radius that defines a limited area in which the distribution information is distributed,
wherein the movement amount calculation section updates, after the communication section has received the distribution information, the movement amount at predetermined time intervals, and
wherein the distribution information management section periodically determines the availability of the distribution information based on a hop count from the information distribution device and the updated movement amount, based on the predetermined time intervals.

6. A non-transitory computer readable storage medium having computer readable program codes embodied in the computer readable storage medium that, when executed cause a computer to function as a wireless communication device and executes:
receiving, from an information distribution device that distributes distribution information or another wireless communication device that has received the distribution information, the distribution information using ad hoc wireless communication;
acquiring position information indicating a current position;
calculating a movement amount from the information distribution device based on a change in the position information acquired by the acquiring;
managing availability of the distribution information based on the movement amount and a predetermined limited area-radius that defines a limited area in which the distribution information is distributed;
updating, after receiving the distribution information, the movement amount at predetermined time intervals; and
periodically determining the availability of the distribution information based on a hop count from the information distribution device and the updated movement amount, based on the predetermined time intervals.

7. The information distribution system according to claim 5, wherein the communication section performs pass-by communication to communicate with another wireless communication device.

8. The non-transitory computer readable storage medium according to claim 6, further comprising performing pass-by communication to communicate with another wireless communication device.

* * * * *